(12) United States Patent
Kawai et al.

(10) Patent No.: US 6,349,188 B1
(45) Date of Patent: *Feb. 19, 2002

(54) PROCESS CARTRIDGE, ELECTROPHOTOGRAPHIC IMAGE FORMING APPARATUS, DRIVING FORCE TRANSMISSION PART AND ELECTROPHOTOGRAPHIC PHOTOSENSITIVE DRUM

(75) Inventors: Toshiharu Kawai; Kazushi Watanabe, both of Yokohama; Yoshihiro Ito, Kawasaki, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/522,293

(22) Filed: Mar. 9, 2000

Related U.S. Application Data

(62) Division of application No. 09/258,314, filed on Feb. 26, 1999, now Pat. No. 6,128,454, which is a division of application No. 08/621,941, filed on Mar. 26, 1996, now Pat. No. 5,903,803.

(30) Foreign Application Priority Data

Mar. 27, 1995 (JP) .............................................. 7-067796
Mar. 21, 1996 (JP) .............................................. 8-064105

(51) Int. Cl.$^7$ .............................................. G03G 15/02
(52) U.S. Cl. ...................... 399/116; 399/111; 399/159; 399/167
(58) Field of Search ................................ 399/110, 111, 399/116, 117, 159, 167

(56) References Cited

U.S. PATENT DOCUMENTS

| | | | |
|---|---|---|---|
| 3,213,719 A | 10/1965 | Kloack | 81/71 |
| 4,454,922 A | 6/1984 | Jamison et al. | 175/323 |
| 4,607,734 A | 8/1986 | Watashi et al. | 192/69.91 |
| 4,829,335 A | 5/1989 | Kanemitsu et al. | |
| 4,975,743 A | 12/1990 | Surti | |
| 5,019,861 A | 5/1991 | Surti | 399/111 |
| 5,023,660 A | 6/1991 | Ebata et al. | |

(List continued on next page.)

FOREIGN PATENT DOCUMENTS

| | | |
|---|---|---|
| EP | 0 115 315 | 8/1984 |
| EP | 0 251 693 | 1/1988 |
| EP | 0 586 041 | 3/1994 |
| EP | 0 622 696 | 11/1994 |
| EP | 0 735 432 | 10/1996 |
| GB | 2 214 609 | 9/1989 |
| JP | 04-282681 | 10/1992 |
| JP | 06-083251 | 3/1994 |

*Primary Examiner*—Sandra Brase
(74) *Attorney, Agent, or Firm*—Fitzpatrick, Cella, Harper & Scinto

(57) ABSTRACT

An electrophotographic image forming apparatus for forming an image on a recording material includes an electrophotographic photosensitive drum; a charging device for charging the photosensitive drum; a developing device for developing a latent image formed on the photosensitive drum into a toner image; a transfer device for transferring the toner image onto the recording material; a fixing device for fixing the toner image on the recording material; a motor; a main assembly side gear for receiving driving force from the motor; a twisted hole formed substantially at a center of the gear, the hole having a polygonal cross-section; a twisted prism projection provided at a longitudinal end of the photosensitive drum, wherein when the main assembly side gear rotates with the hole and projection engaged with each other, rotational driving force is transmitted from the gear to the photosensitive drum through the hole and the projection with the projection being pulled into the hole; and a moving device for imparting relative movement between the hole and the projection in a longitudinal direction of the photosensitive drum.

10 Claims, 18 Drawing Sheets

U.S. PATENT DOCUMENTS

| | | |
|---|---|---|
| 5,095,335 A | 3/1992 | Watanabe et al. |
| 5,151,734 A | 9/1992 | Tsuda et al. |
| 5,223,893 A | 6/1993 | Ikemoto et al. |
| 5,280,224 A | 1/1994 | Sagara ................ 318/265 |
| 5,331,372 A | 7/1994 | Tsuda et al. |
| 5,345,294 A | 9/1994 | Nomura et al. |
| 5,353,100 A | 10/1994 | Ohtsuka |
| 5,404,198 A | 4/1995 | Noda et al. |
| 5,436,699 A | 7/1995 | Komaki |
| 5,452,064 A | 9/1995 | Inomata ................ 399/299 |
| 5,463,446 A | 10/1995 | Watanabe et al. |
| 5,465,136 A | 11/1995 | Watanabe |
| 5,475,470 A | 12/1995 | Sasago et al. |
| 5,488,459 A | 1/1996 | Tsuda et al. |
| 5,510,878 A | 4/1996 | Noda et al. |
| 5,903,803 A | 5/1999 | Kawai et al. ............ 399/116 |

PROCESS CARTRIDGE, ELECTROPHOTOGRAPHIC IMAGE FORMING APPARATUS, DRIVING FORCE TRANSMISSION PART AND ELECTROPHOTOGRAPHIC PHOTOSENSITIVE DRUM

This application is a divisional of application Ser. No. 09/258,314, filed Feb. 26, 1999, now U.S. Pat. No. 6,128,454, which is a divisional of application Ser. No. 08/621,941, filed Mar. 26, 1996, now U.S. Pat. No. 5,903,803, issued May 11, 1999.

FIELD OF THE INVENTION

The present invention relates to a process cartridge, an electrophotographic image forming apparatus, a driving force transmission part and an electrophotographic photosensitive drum. Here, the electrophotographic image forming apparatus means an apparatus using an electrophotographic image formation type process to form an image on a recording medium. Examples of the electrophotographic image forming apparatus include an electrophotographic copying machine, an electrophotographic printer (laser beam printer, LED printer or the like), a facsimile device and a word processor.

DESCRIPTION OF THE RELATED ART

Here, the process cartridge may be a cartridge which is detachably mountable to a main assembly of an image forming apparatus and which contains as a unit an electrophotographic photosensitive member and at least one one of process means such as charging means, developing means, cleaning means or the like. The process cartridge may be a cartridge which is detachably mountable to a main assembly of an image forming apparatus and which contains as an unit a electrophotographic photosensitive member and a process means such as charging means, developing means, cleaning means or the like. The process cartridge may be a cartridge which is detachably mountable to a main assembly of an image forming apparatus and which contains as a unit an electrophotographic photosensitive member and developing means. Since the process cartridge is detachably mountable relative to the main assembly of the device, the maintenance of the device is easy.

An electrophotographic image forming apparatus using the electrophotographic image formation type is such that a latent image is formed by selectively exposing the electrophotographic photosensitive member uniformly charged by charging means to image information light. The latent image is developed with toner by a developing means into a toner image. The toner image thus formed is transferred onto a recording medium by transferring means to form an image on the recording material.

Various methods have been proposed to rotate the electrophotographic photosensitive drum.

In one method, as disclosed U.S. Pat. No. 5,023,660, pins fixed on a side surface of the gear provided on the main assembly are engaged with recesses formed in a side surface of a gear provided in the photosensitive drum, by which the photosensitive drum is rotated.

In another method, as disclosed U.S. Pat. No. 4,829,335, a helical gear provided in the main assembly and the helical gear provided on the photosensitive drum, are engaged to rotate the photosensitive drum.

These methods are both very effective for transmitting the rotation force to the photosensitive drum. The present invention is a further and fundamental improvement of the conventional methods and structures.

SUMMARY OF THE INVENTION

Accordingly, it is a principal object of the present invention to provide a process cartridge, an electrophotographic image forming apparatus, a driving force transmission part, and an electrophotographic photosensitive drum, wherein rotation accuracy of the electrophotographic photosensitive drum is improved.

It is another object of the present invention to provide a process cartridge, an electrophotographic image forming apparatus, a driving force transmission part, and an electrophotographic photosensitive drum, wherein the driving force is transmitted to the electrophotographic photosensitive drum from the main assembly assuredly.

It is a further object of the present invention to provide a process cartridge, electrophotographic image forming apparatus, driving force transmission part, and an electrophotographic photosensitive drum, wherein the rotation center of a coupling of the main assembly of the device is made concentric with the rotation center of a coupling of the electrophotographic photosensitive drum when the driving force is transmitted (upon an image forming operation).

It is a further object of the present invention to provide a process cartridge, an electrophotographic image forming apparatus, a driving force transmission part and an electrophotographic photosensitive drum, wherein the positioning of the process cartridge relative to the device is improved by pulling the electrophotographic photosensitive drum into the main assembly side when the driving force is transmitted.

It is a further object of the present invention to provide a process cartridge, an electrophotographic image forming apparatus, a driving force transmission part, and an electrophotographic photosensitive drum, wherein an image quality is improved.

It is a further object of the present invention to provide a process cartridge, an electrophotographic image forming apparatus, a driving force transmission part, and an electrophotographic photosensitive drum, wherein the connection in the driving force transmission mechanism between the main assembly and the process cartridge is broken when the driving force is not transmitted (non-image-formation period), so that the operativity in demounting the process cartridge from the main assembly is improved.

According to an aspect of the present invention, there is provided a process cartridge detachably mountable to a main assembly of an image forming apparatus for forming an image on a recording material, said main assembly including a motor, a driving rotatable member for receiving driving force from said motor and a twisted recess or projection having a non-circular cross-section and substantially coaxial with a rotation axis of said drive rotatable member, comprising: a rotatable image bearing member; process means actable on said photosensitive drum; and a twisted projection or recess provided at a longitudinal end of said image bearing member, having a non-circular cross-section and substantially coaxial with a rotation axis of said image bearing member, wherein said projection or recess of said image bearing member has such a dimension and configuration that it can take a first relative rotational position with respect to said recess or projection of said driving rotatable member in which relative rotational movement therebetween is permitted, and a second relative rotational position with respect to said recess or projection of said driving rotatable member in which relative rotational movement is prevented in one rotational direction, while the rotation axis of said driving rotatable member and the rotation axis of said image bearing member are substantially aligned.

According to another aspect of the present invention, there is provided an electrophotographic image forming apparatus for forming an image on a recording material, comprising: an electrophotographic photosensitive drum; charging means for charging said photosensitive drum; developing means for developing a latent image formed on said photosensitive drum into a toner image; transfer means for transferring the toner image onto the recording material; fixing means for fixing the toner image on the recording material; a motor; a main assembly side gear for receiving driving force from said motor; a twisted hole formed substantially at a center of said gear, said hole having a polygonal cross-section; a twisted prism projection provided at a longitudinal end of said photosensitive drum, wherein when said main assembly side gear rotates with said hole and projection engaged with each other, rotational driving force is transmitted from said gear to said photosensitive drum through said hole and said projection with said projection being pulled into said hole; and moving means for imparting relative movement between said hole and said projection in a longitudinal direction of said photosensitive drum.

According to another aspect of the present invention, there is provided a process cartridge detachably mountable to a main assembly of an image forming apparatus, wherein said main assembly includes a motor, a main assembly side gear for receiving driving force from said motor and a twisted hole formed substantially at a center of said gear, said hole having a polygonal cross-section; an electrophotographic photosensitive drum; process means actable on said photosensitive drum; and a twisted polygonal prism projection provided at a longitudinal end of said photosensitive drum, wherein when said main assembly side gear rotates with said hole and projection engaged with each other, rotational driving force is transmitted from said gear to said photosensitive drum through said hole and said projection with said projection being pulled into said hole.

According to another aspect of the present invention, there is provided an electrophotographic image forming apparatus, for forming an image on a recording material, to which a process cartridge is detachably mountable comprising: a motor; a main assembly side gear for receiving driving force from said motor; a twisted hole formed substantially at a center of said gear, said hole having a polygonal cross-section; means for mounting a process cartridge which includes: an electrophotographic photosensitive drum; process means actable on said photosensitive drum; a twisted polygonal prism projection provided at a longitudinal end of said photosensitive drum, wherein when said main assembly side gear rotates with said hole and projection engaged with each other, rotational driving force is transmitted from said gear to said photosensitive drum through said hole and said projection with said projection being pulled into said hole; and said apparatus further comprising; moving means for imparting relative movement between said hole and said projection in a longitudinal direction of said photosensitive drum; and means for feeding the recording material.

According to another aspect of the present invention, there is provided a drive transmission part for transmitting driving force to an electrophotographic photosensitive drum and a developing roller for developing a latent image formed on said photosensitive drum, which are contained in a process cartridge detachably mountable to a main assembly of an image forming apparatus for forming an image on a recording material, said main assembly including a motor, a main assembly side gear for receiving driving force from said motor, and a twisted hole formed substantially at a center of said gear, said hole having a polygonal cross-section; a gear for transmitting driving force to said developing roller from said main assembly to said developing roller when said process cartridge is mounted to the main assembly; and a shaft provided substantially at a center of said gear; and a twisted polygonal prism projection provided at an end of said shaft, wherein said projection receives driving force from the main assembly through engagement between said hole and projection, wherein the driving force is transmitted to said photosensitive drum through the shaft, and is transmitted to said developing roller through said gear.

According to another aspect of the present invention, there is provided a photosensitive drum, which is contained in a process cartridge detachably mountable to a main assembly of an image forming apparatus for forming an image on a recording material, said main assembly including a motor, a main assembly side gear for receiving driving force from said motor, and a twisted hole formed substantially at a center of said gear, said hole having a polygonal cross-section; a cylinder having a photosensitive layer thereon; a drive transmission member mounted to an end of said cylinder, said transmission member including: a gear for transmitting driving force to said developing roller from said main assembly to said developing roller when said process cartridge is mounted to the main assembly; a shaft provided substantially at a center of said gear; and a twisted polygonal prism projection provided at an end of said shaft, wherein said projection receives driving force from the main assembly through engagement between said hole and projection, wherein the driving force is transmitted to said photosensitive drum through the shaft, and is transmitted to said developing roller through said gear.

In the foregoing the recess and projection may be exchanged with each other.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Embodiments of the present invention will be described in conjunction with the accompanying drawings.

Embodiment 1

Referring to FIG. 1 to FIG. 10, the description will be made as to a process cartridge and an electrophotographic image forming apparatus to which it is detachably mountable according to embodiment 1. In the following description, the general arrangement of the process cartridge and the electrophotographic image forming apparatus usable therewith will be first described referring to FIG. 1 to FIG. 6, and then the structure of a coupling of a driving force transmission mechanism between the process cartridge and the image forming apparatus will be described, referring to FIG. 7 to FIG. 10.

{General Arrangement}

Figure 1:
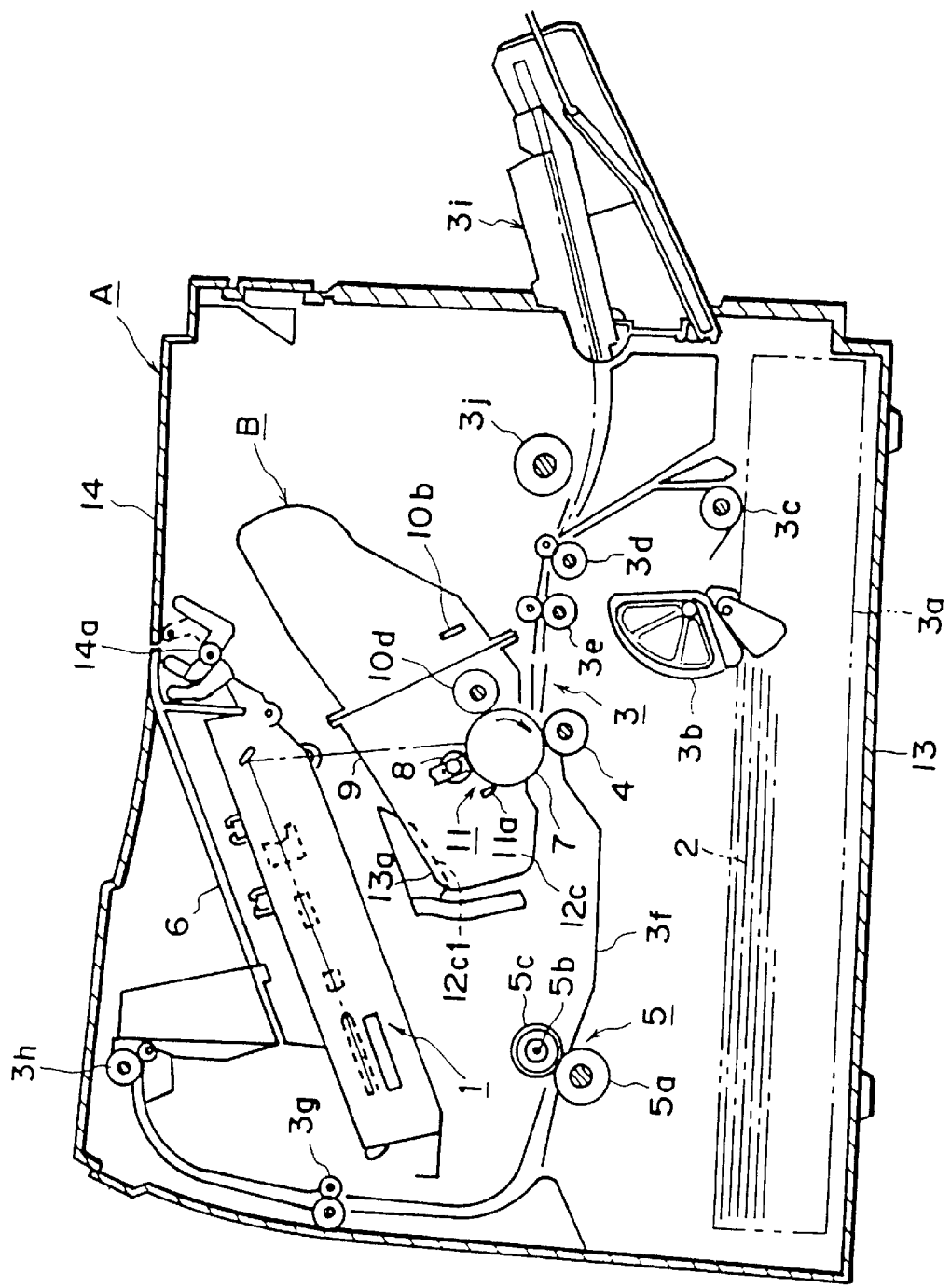
FIG. 1 is a cross-sectional view of an electrophotographic image forming apparatus according to an embodiment of the present invention.
Figure 2:
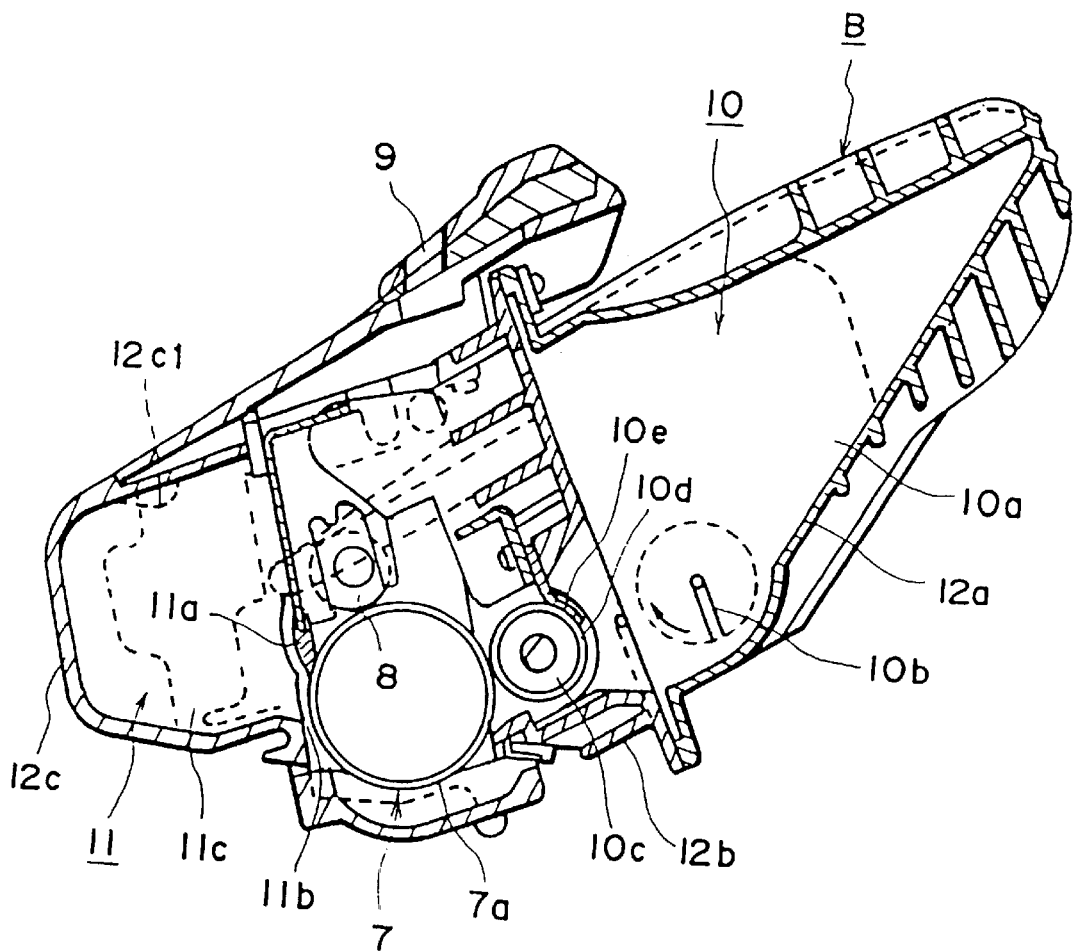
FIG. 2 is a cross-sectional view of a process cartridge according to an embodiment of the present invention.
Figure 3:
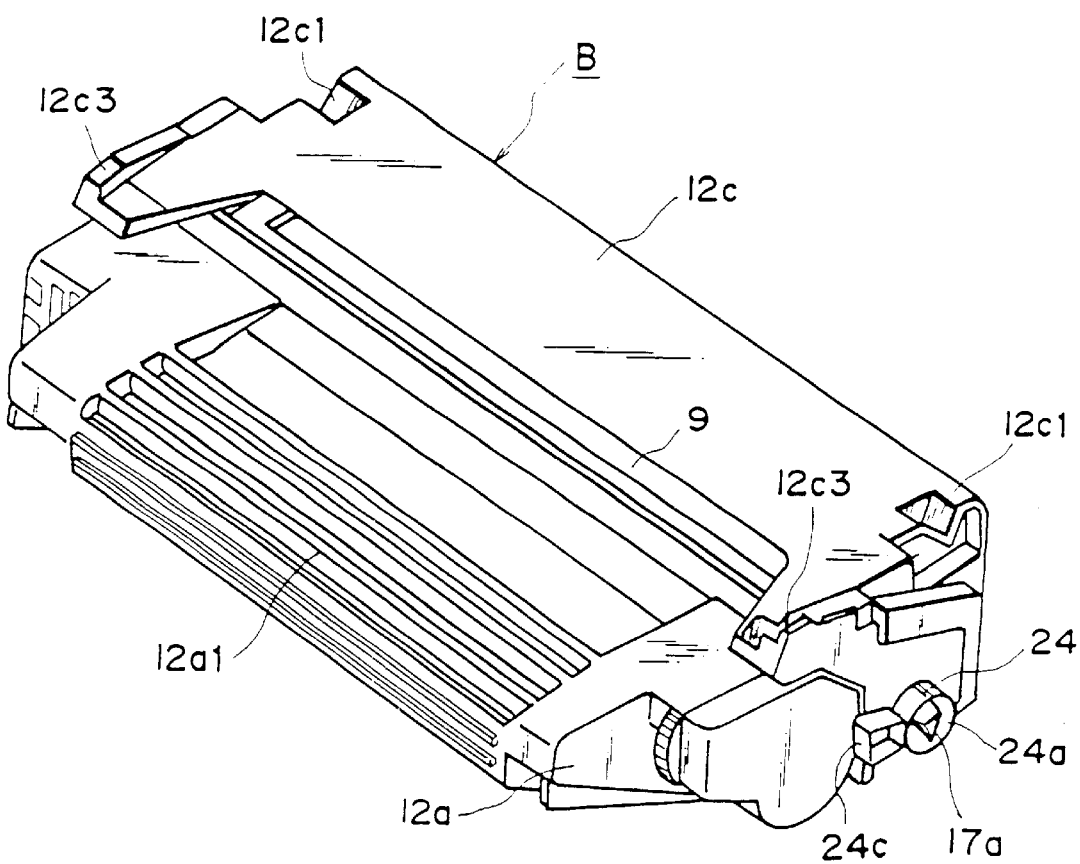
FIG. 3 is perspective view a process cartridge according to an embodiment of the present invention.
Figure 4:
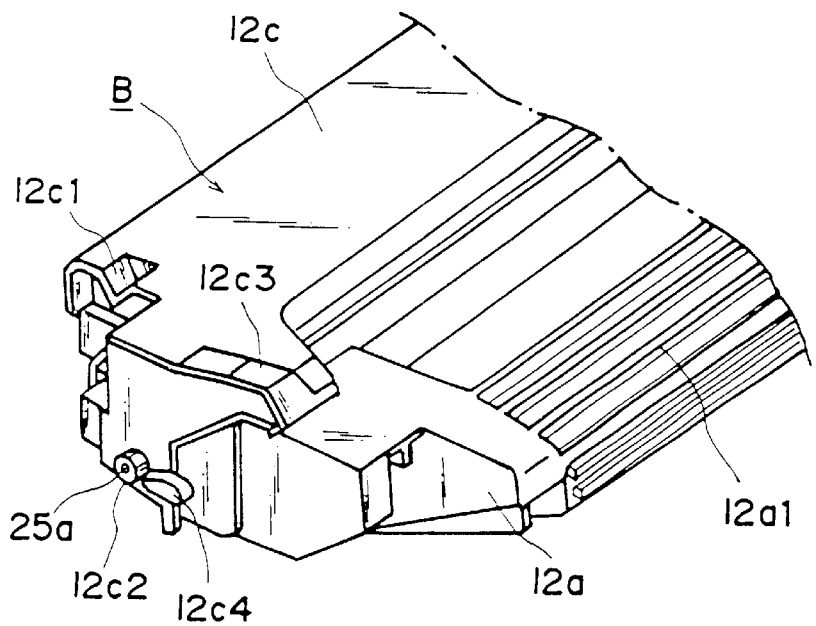
FIG. 4 is a perspective view of a process cartridge according to an embodiment of the present invention.
Figure 5:
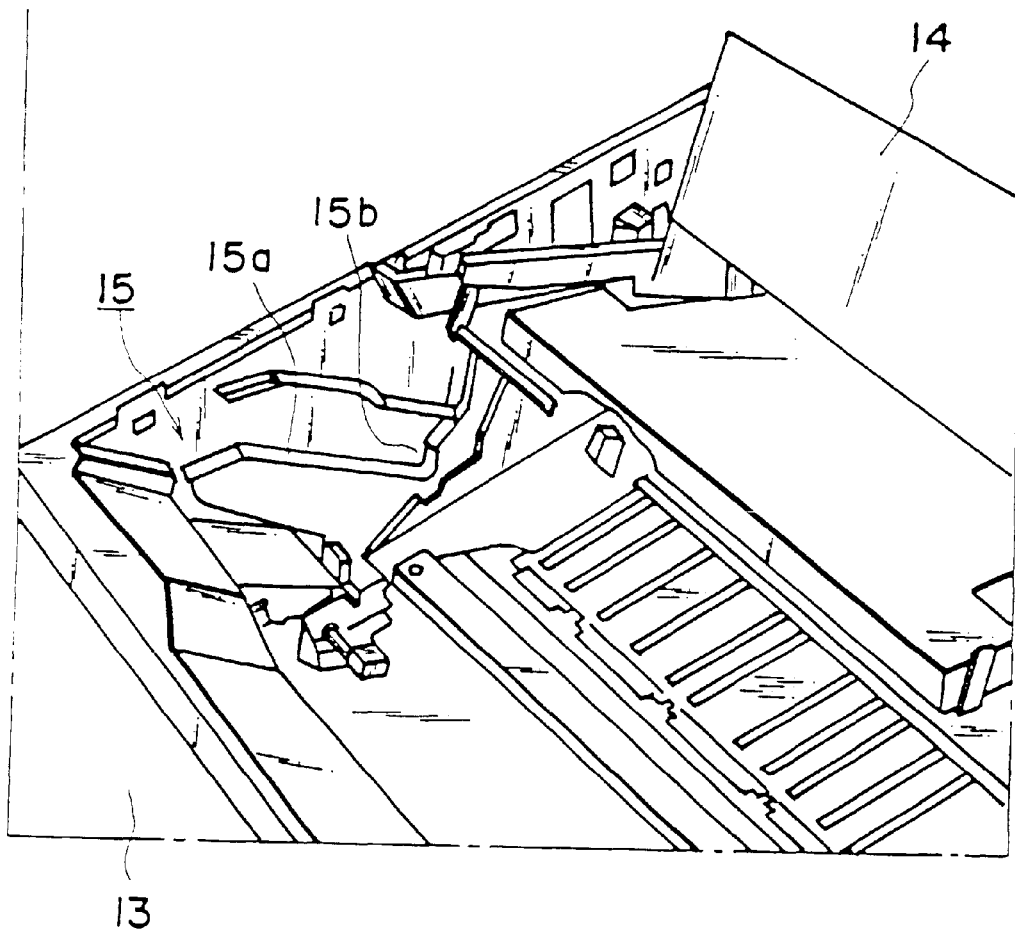
FIG. 5 is a perspective view of a process cartridge mounting portion of a main assembly of an electrophotographic image forming apparatus according to an embodiment of the present invention.
Figure 6:
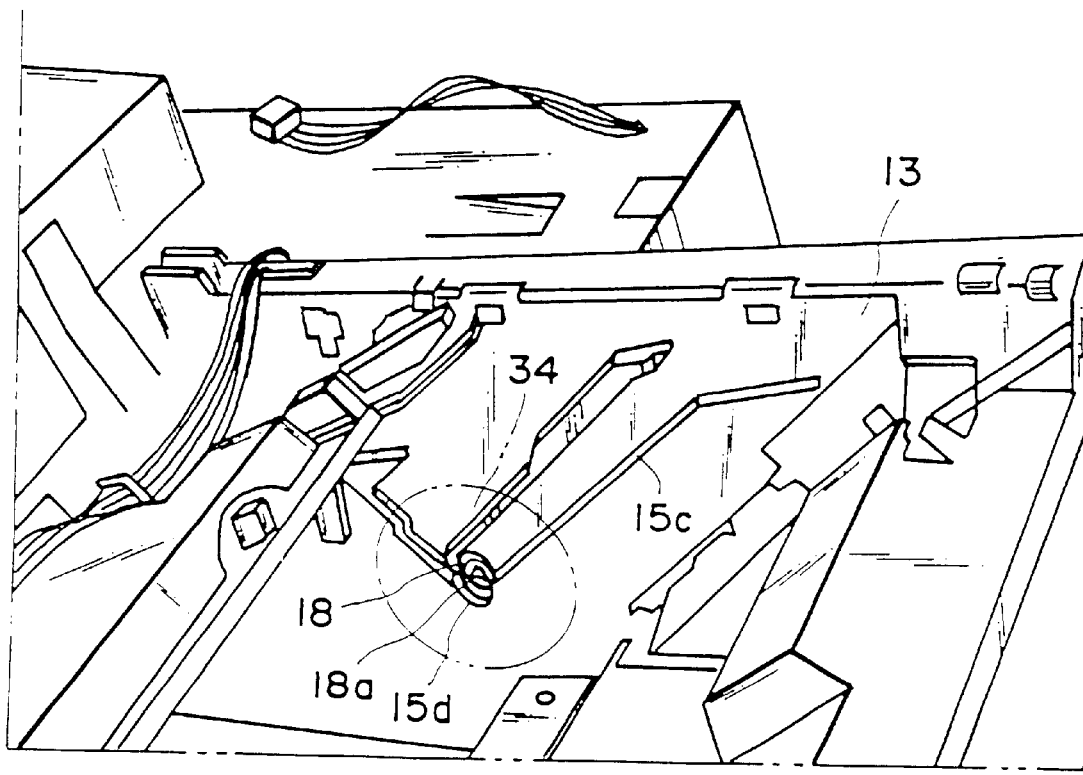
FIG. 6 is a perspective view of a process cartridge mounting portion of a main assembly of an electrophotographic image forming apparatus according to an embodiment of the present invention.

FIG. 1 is a schematic view of the electrophotographic image forming apparatus A to which the process cartridge is mounted; FIG. 2 is a cross-sectional view of the process cartridge B; FIG. 3 and 4 are perspective views of an outer appearance of the process cartridge; and FIGS. 5 and 6 illustrate device structures for mounting the process cartridge to the main assembly of the device.

In this electrophotographic image forming apparatus (laser beam printer in the embodiment), as shown in FIG. 1, an electrophotographic photosensitive member 7 of a drum configuration is exposed to a laser beam based on image information supplied from an optical system 1 so that a latent image is formed on the photosensitive member,, and the latent image is developed with toner into a toner image. In synchronism with the formation of the toner image, a recording medium 2 (recording sheet or the like) is fed from a feeding cassette 3*a* by transporting means 3 comprising pick-up rollers 3*b*, feeding rollers 3*c*, feeding rollers 3*d*, registration rollers 3*e* or the like. The toner image formed on the photosensitive drum 7 is transferred onto the recording medium 2 by voltage application to the transfer roller 4 as transferring means. The recording medium 2 is guided by a guide plate 3*f* to a fixing means 5. The fixing means 5 comprises a fixing roller 5*c* comprising a driving roller 5*a* and a heater 5*b*, and applies heat and pressure to the recording medium 2 to fix the transferred toner image onto the recording medium 2. The recording medium 2 is fed by the discharging rollers 3*g* and 3*h*, and is discharged to the discharging portion 6 through a reversion feeding path. In the image forming apparatus A, manual sheet feeding is possible using a manual feed tray and roller 3*j*.

The process cartridge B contains the electrophotographic photosensitive member and at least one process means. The process means includes, for example, charging means for charging the electrophotographic photosensitive member, developing means for developing the latent image on the electrophotographic photosensitive member, and cleaning means for removing the residual toner from the surface of the electrophotographic photosensitive member.

The process cartridge B of this example contains a photosensitive drum 7, the charging roller 8, the exposure opening 9, and the developing means 10, as shown. The electrophotographic photosensitive drum 7 in the process cartridge B is rotated through a coupling mechanism by the main assembly 13 of the device, as will be described hereinafter. The surface of the photosensitive drum is subjected to uniform charging by voltage application from the charging roller 8 which is a charging means, and the information light from the optical system 1 is projected onto the photosensitive drum 7 through an exposure opening 9 to form a latent image, which is developed by the developing means 10.

In the developing means 10, the toner in a toner accommodating portion 10a is fed out by rotation of a feeding member 10b. A developing roller 10d containing a fixed magnet 10c is rotated so that a toner layer having triboelectric charge provided by a development blade 10e is formed on the surface of the developing roller 10d. The toner is transferred to the photosensitive drum 7 in accordance with the latent image to form the toner image (visualization). The toner image is transferred onto the recording medium 2 by application of the voltage of the opposite polarity from the toner image to the transfer roller 4 provided in the main assembly 13 of the device. The photosensitive drum 7 after transfer is cleaned by the cleaning means 11 so that the residual toner is removed. More particularly, the toner is scraped off by the cleaning blade 11a. The toner thus removed is collected in a residual toner container 11c by a receptor sheet 11b.

The charging roller 8 is contacted to the photosensitive drum 7 and is driven by the photosensitive drum 7. The cleaning blade 11a is contacted to the photosensitive drum 7.

The process cartridge B comprises a toner frame 12a having a toner accommodating portion 10a accommodating toner and a developing frame 12b supporting a developing member such as a developing roller 10d, which frames are welded together (ultrasonic welding in this example) to form a developing unit. This developing unit is swingably coupled with a cleaning frame 12c supporting the photosensitive drum 7, the charging roller 8, the cleaning means 11 and the like. The process cartridge B is mounted to a cartridge mounting means of the main assembly 13 of the device by a user in a direction crossing with a longitudinal direction of the photosensitive drum 7 (FIGS. 5 and 6). The cleaning frame 12c is provided with mounting guides 12c4 adjacent a bearing 12c2. The bearing 24 (projection 24a) mounted to the cleaning frame 12c is provided with a guide 24c, the bearing 24, projection 24a and guide 24c are integrally molded. The mounting guides 24c is guided by guides 15a and 15b when the process cartridge B is mounted.

As cartridge mounting means, as shown in FIG. 5, cartridge mounting guiding members 15 are mounted opposed to each other on left and right sides of a cartridge mounting space of the main assembly 13 (one side in FIG. 5 and the other side in FIG. 6). The guiding members 15 have guide portions 15a and 15c opposed to each other to function as guides when the process cartridge B is pushed into the main assembly. The process cartridge is inserted while bosses or the like projected from opposite longitudinal ends of the cartridge frame are guided by the guide portions 15a and 15c. When the process cartridge B is to be mounted to the main assembly 13, a cover 14 which is openable about a shaft 14a is opened. By closing the openable cover 14, the process cartridge B is correctly mounted to the image forming apparatus A. When the process cartridge B is taken out from the main assembly 13, the openable cover 14 is opened.

When the process cartridge B is mounted to the image forming apparatus A, the cartridge side coupling and the main assembly side coupling are combined in interrelation with the closing operation of the openable cover 14, as will be described hereinafter, so that the photosensitive drum 7 and the like can receive the driving force from the main assembly.

{Coupling and Driving Structure}

The description will be made as to the structure of the coupling means which is a driving force transmission mechanism for transmitting the driving force to the process cartridge B from the main assembly 13 of the image forming apparatus.

Figure 7:
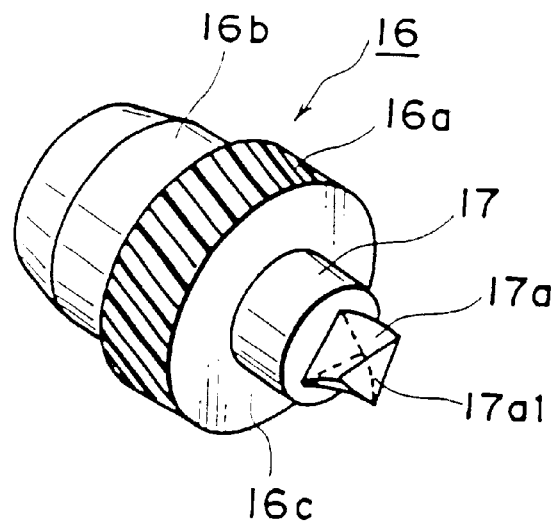
FIG. 7 is a perspective view of a drum flange(driving force transmission part) according to an embodiment of the present invention.
Figure 8:
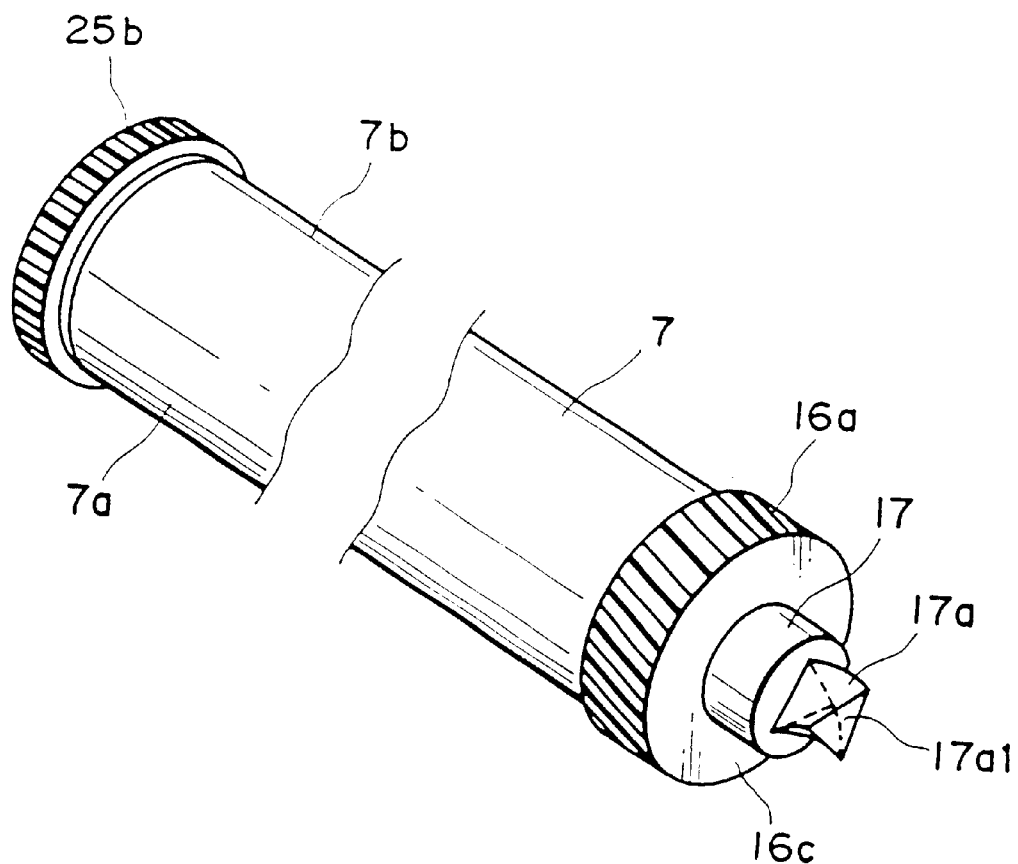
FIG. 8 is a perspective view of a photosensitive drum according to an embodiment of the present invention.
Figure 9:
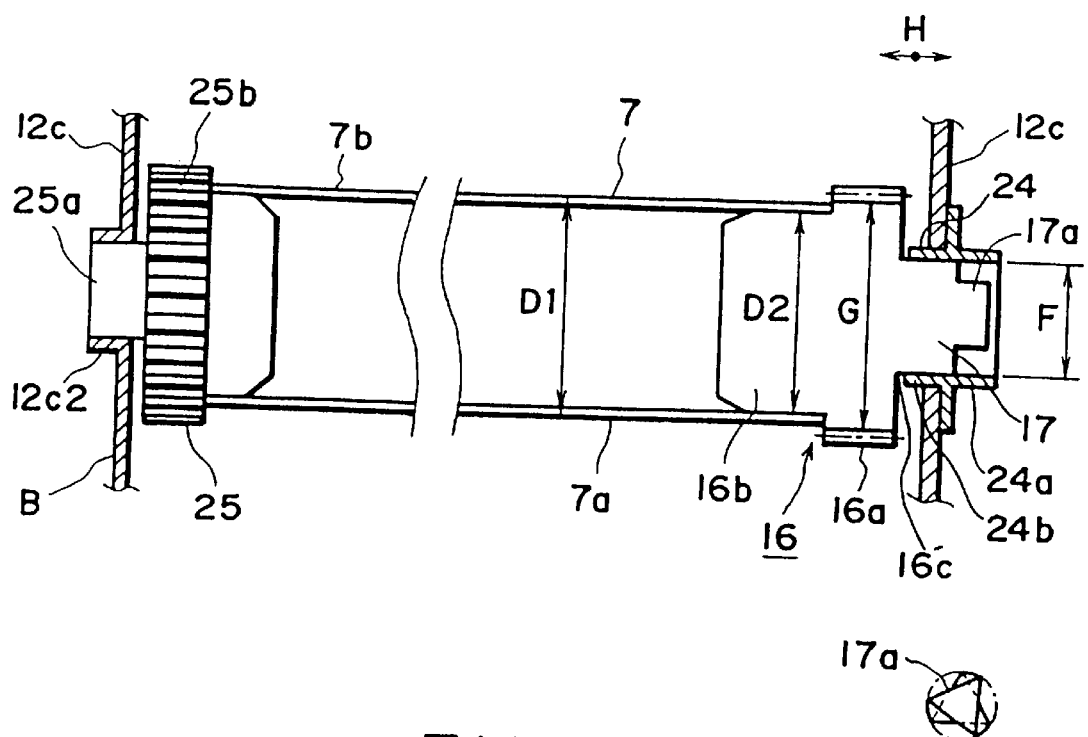
FIG. 9 is a sectional view of a process cartridge side coupling portion according to an embodiment of the present invention.
Figure 10:
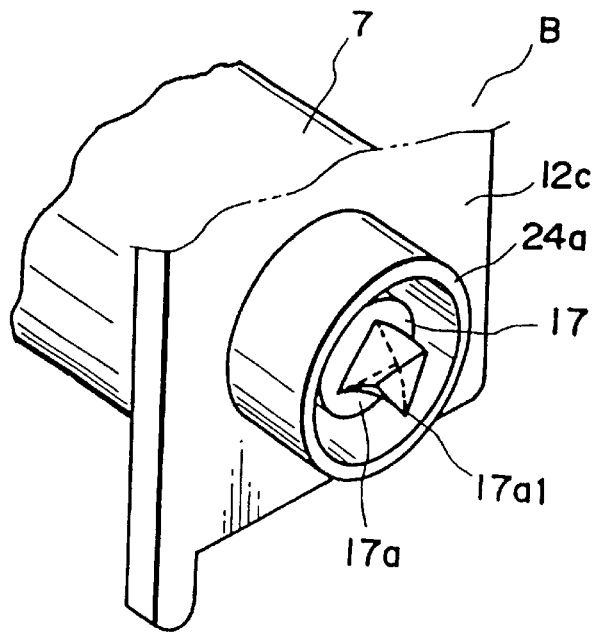
FIG. 10 is a perspective view of a coupling portion of a process cartridge according to an embodiment of the present invention.
Figure 11:
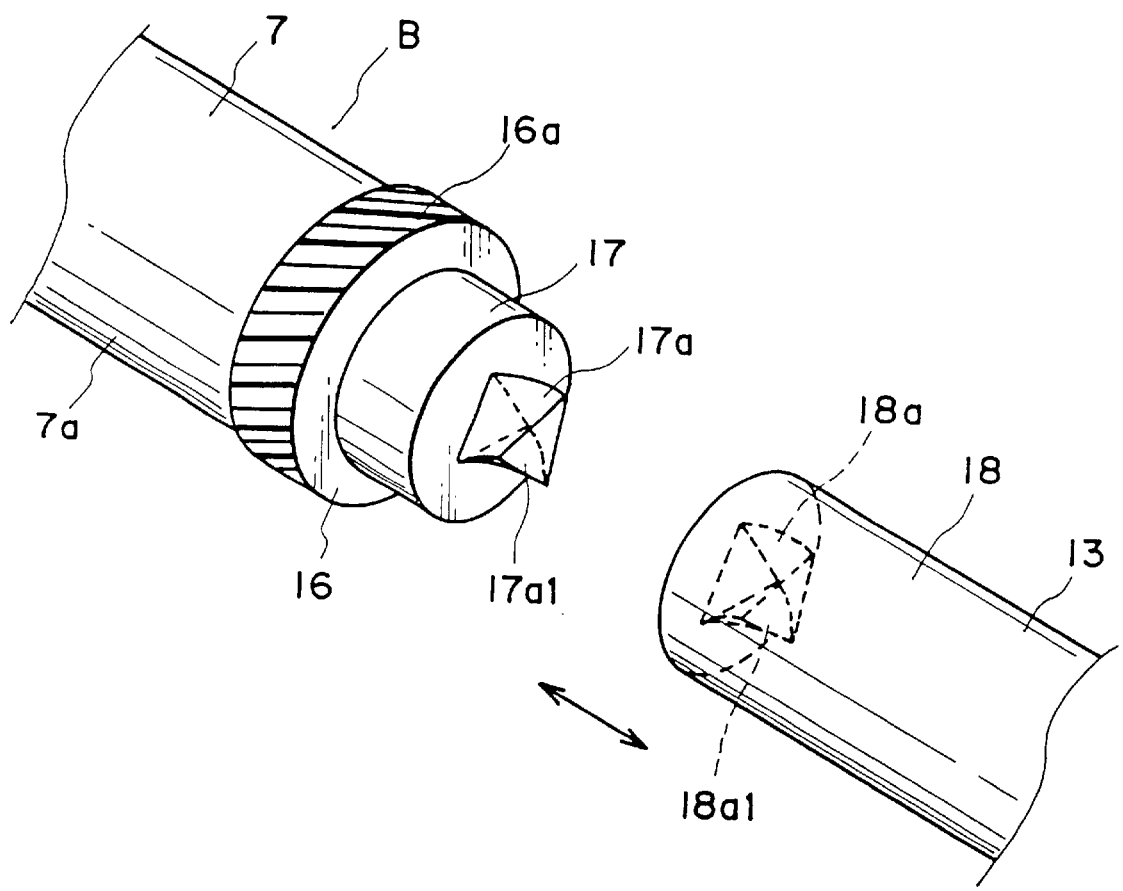
FIG. 11 is a sectional view of a driving system of a main assembly of an electrophotographic image forming apparatus according to an embodiment of the present invention.

FIG. 7 is a perspective view of a drum flange 16 as a driving force transmission part having an integrally formed male shaft 17; FIG. 8 is a partly sectional perspective view of the photosensitive drum 7 having a drum flange 16 mounted thereto; FIG. 9 is a sectional view wherein the photosensitive drum 7 is mounted to the process cartridge B; FIG. 10 is an enlarged perspective view of the male shaft 17 of the process cartridge B of FIG. 9; FIG. 11 shows a relation between the male shaft 17 (provided to the process cartridge B) and the female shaft 18 (provided to the main assembly 13).

As shown in FIG. 8 to FIG. 11, there is provided a cartridge side coupling means at a longitudinal end of the photosensitive drum 7 in the process cartridge B. The coupling means has a male coupling shaft 17 (circular column configuration) mounted to the drum flange 16 fixed to an end of the photosensitive drum 7. Here, the end surface of the projection 17a is parallel with the end surface of the projection shaft 17. The male shaft 17 is engaged with a bearing 24 and functions as a drum rotational shaft. In this example, the flange 16, male coupling shaft 17 and the projection 17a are integrally formed. The flange 16 is provided with a helical gear 16a for transmitting the driving force to the developing roller 10d in the process cartridge. Therefore, as shown in FIG. 7, the drum flange 16 is an integrally molded member having the helical gear 16a, the male shaft 17 and the projection 17a, and is a driving force transmission part having the function of transmitting the driving force.

The projection 17a has a twisted polygonal prism configuration, more particularly, the configuration resulting from twisting a substantially equilateral triangular prism in the rotational direction. The recess 18a is a polygonal shape twisted in the rotational direction of the shaft and therefore is engageable with or complimentary with the projection 17a. The recess 18a has a section of a substantially equilateral triangle. The recess 18a integrally rotates with the gear 34 of the main assembly 13. In the structure of this example, the process cartridge B is mounted to the main assembly 13, and the projection 17a and the recess 18a of the main assembly 13 are engaged. When the rotation force is transmitted from the recess 18a to the projection 17a, the apexes of the projection 17a of the equilateral triangle are contacted regularly with the inside surfaces of the recess 18a, and therefore, the centers thereof are automatically aligned by the rotation, as will be understood from FIGS. 8(a) and (b). Further, the force in the direction of pulling deviating the projection 17 to the recess 18 is produced during rotation due to the twisting directions thereof, so that the end surface 17a1 of the projection is contacted to the recess 18a1. Since the photosensitive drum 7 is integral with the projection 17a, the axial position and radial position there are correctly determined in the main assembly 13 of the image forming apparatus.

In this example, as seen from the photosensitive drum 7, the direction of twisting of the projection 17a is opposite from the rotation direction of the photosensitive drum 7 away from the base portion of the projection toward the end portion thereof. The direction of twisting of the recess 18a is opposite therefrom away from the inlet portion of the recess 18a toward the inside. The direction of twisting of the helical gear 16a of the drum flange 16, which will be described hereinafter, is opposite from the twisting direction of the projection 17a.

Figure 18:
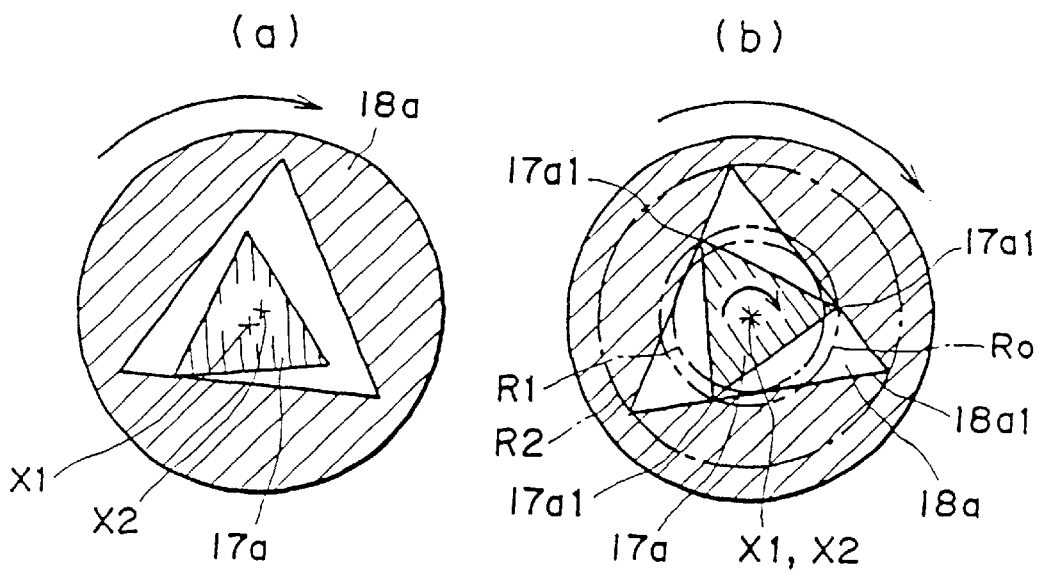
FIGS. 18(*a*) and 18(*b*) sectional are views of a recess and a coupling projection according to an embodiment of the present invention.

As shown in FIG. 18, the projection 17a and the recess 18a satisfy d1<d0<d2, where d0 is a diameter of a circumscribed circle R0 of the triangular prism of the projection 17a, d1 is a diameter of an inscribed circle R1 of the space in the form of triangle of the recess 18a, and d2 is a diameter of a circumscribed circle R2 of the triangle.

Preferable examples of the numerical ranges of the diameters are as follows:

d0=approx. 3 mm–70 mm
d1=approx. 3 mm–70 mm
d2=approx. 3 mm–70 mm.

In these ranges, the sizes are selected so as to satisfy the above-described relations.

In this example, the sizes are as follows:

d0=approx. 16 mm
d1=approx. 9.5 mm
d2=approx. 17.5 mm.

The degree or amount of the twisting of the projection 17a is approx. 10°–15° per 1 mm of the axial length of the projection 17a in the rotational direction. More particularly, in this example, it is twisted at approx. 7.5° per 1 mm of the axial length.

However, the present invention is not limited to these values.

The position of a cross-section of a three dimensional member is determined by three contact points, theoretically. When the configurations of the projections 17a and the recesses 18a are substantially an equilateral triangular, the apexes of the projection 17a are contacted to the inside surfaces of the equilateral triangle under the same conditions. Therefore, the changes of the contact points and the rotation non-uniformity of the coupling driving due to the load variation during the rotation of the process cartridge B are minimized, thus improving the rotation accuracy of the photosensitive drum 7 (FIG. 18). The male shaft 17 and projection 17a are provided on the drum flange 16 so that when the drum flange 16 is mounted to an end of the photosensitive drum 7, it is aligned with the axis of the photosensitive drum 7. Designated by 16b is an engaging portion which is engaged with an inside surface of the drum cylinder 7a when the drum flange 16 is mounted to the photosensitive drum 7. The drum flange 16 is mounted to the photosensitive drum 7 by cramping, bonding or the like. The outer surface of the drum cylinder 7a is coated with a photosensitive material 7b (FIGS. 8 and 9 reference).

A drum flange 25 is fixed to the other end side of the photosensitive drum 7. The drum flange 25 has a drum shaft 25a and spur gear 25b integrally formed therewith.

When the process cartridge B is mounted to the main assembly 13 of the apparatus, the drum shaft 25a (bearing 12c2) is engaged with an U groove 15b (FIG. 5) of the main assembly 13 of the apparatus so as to be correctly positioned, and the spur gear 25b integrally molded with the flange 25 is meshed with a gear (shown) for transmitting the driving force to the transfer roller 4.

Examples of the material of the drum flange 16 include polyacetal, polycarbonate and polyamide polybutylene terephthalate, or another resin material. Other materials are usable.

Around the projection 17a of the male coupling shaft 17 of the process cartridge B, a circular projection 24a coaxial with the male shaft 17 is provided on the cleaning frame 12c (FIGS. 3 and 9). The projection 24a functions to protect the coupling projection 17a when, for example, the process cartridge B is mounted or demounted relative to the main assembly, so that the coupling projection 17a is prevented from being damaged or deformed by external force or the like. Thus, the vibration or wobbles during the coupling driving operation due to the damage of the projection 17a, can be avoided.

The projection 24a also can function as a guiding member for the mounting and demounting of the process cartridge B relative to the main assembly 13 of the image forming apparatus. More particularly, when the process cartridge B is mounted to the main assembly A, the projection 24a is contacted to the main assembly side guide portion 15c and functions to guide the process cartridge B to the mounting position of the apparatus, thus facilitating the mounting-and-demounting of the process cartridge B relative to the main assembly 13. When the process cartridge B is mounted to the mounting position, the projection 24a is supported by the recess 15d provided on the guide portion 15c. When the male coupling shaft 17 and female shaft 18 are aligned by the driving for the image formation, the projection 24a is raised slightly from the U groove 15d (approx. 0.3 mm–1.0 mm), and the gap between the projection 24a and the main assembly guide portion 15a (recess 15d) is smaller than the gap between the coupling projection 17a and the recess 18a in the radial direction. Therefore, the engagement between the coupling projection 17a and the recess 18a are permitted while the process cartridge B is mounted to the main assembly 13. A recess 18a is provided opposed to the U groove 15d. The configuration of the projection 24a is not limited to circular as in this example, but may be any, for example, arcuate configuration, if it is guided by the guide portion 15c, and is supported by the U groove 15d. In this example, the bearing 24 for supporting rotatably the shaft portion 17 and the circular projection 24a are integrally molded, and are fixed to the cleaning frame 12c by screws (FIG. 9), but the bearing 24 and the projection 24a may be separate members.

In this example, the drum shaft 25a is engaged with the bearing portion 12c2 provided in the cleaning frame 12c (FIG. 49), and the male shaft 17 is engaged to the inside surface of the bearing 24 provided in the cleaning frame 12c, and with this state, the photosensitive drum 7 is mounted to the cleaning frame 12c of the process cartridge B. Therefore, the photosensitive drum 7 is rotated about the shaft 17 and 25a. In this example, the photosensitive drum 7 is mounted to the cleaning frame 12c in the manner that the movement thereof in the axial direction is possible. This is done in consideration of the mounting tolerance. This structure is not inevitable, and the photosensitive drum 7 may be non-movable in the slide direction.

Among the photosensitive drum 7, the flange 16 and the male coupling shaft 17, there is a relationship as shown in FIG. 9. More particularly, the outer diameter of the photosensitive drum 7 (outer diameter of the cylinder 7a)=D1, the helical gear dedendum circle diameter=G, the diameter of the photosensitive drum bearing (outer diameter of the shaft portion 17, the inner diameter of the bearing 24)=F, the diameter=C of the circumscribed circle of the coupling projection, and the engaging portion diameter (drum inner diameter)=D2 of the drum flange 16 relative to the photosensitive drum 7, satisfy D1>F≧C and G>D2.

The D1>F is effective to reduce the torque required by the sliding load at the bearing. The F≧C is effective to simplify the mold structure when the flange portion is molded since the undercut portion is not required which otherwise is required in the mold division of the mold in the direction of the arrow H in the Figure.

Furthermore, because G>D2 is satisfied, the mold configuration of the gear portion is on the left side mold in FIG. 6, and therefore, the right side mold structure which is complicated due to the provision of the coupling configuration is simplified, and therefore, the durability of the mold is improved.

The dimensional relations apply in the case that the relation between the male shaft 17 and the female shaft 18 are reversed, that is, in the case that the photosensitive drum is provided with the recess 18a while the main assembly side of the apparatus is provided with the projection 17a (the diameter of the circumscribed circle of the polygonal of the recess 18a is C). The same advantages are provided in such a case, too.

Examples of the numerical ranges of them are as follows:
D1=approx. 10 mm–60 mm
G=approx. 10 mm–70 mm
F=approx. 5 mm–70 mm
C=approx. 3 mm–70 mm
D2=approx. 9 mm–59 mm.

The sizes may be selected within these ranges so as to satisfy the above-described relations.

In this example, sizes are as follows:
D1=approx. 30 mm
G=approx. 31 mm
F=approx. 16 mm
C=approx. 14 mm.

However, the present invention is not limited to these sizes.

Figure 12:
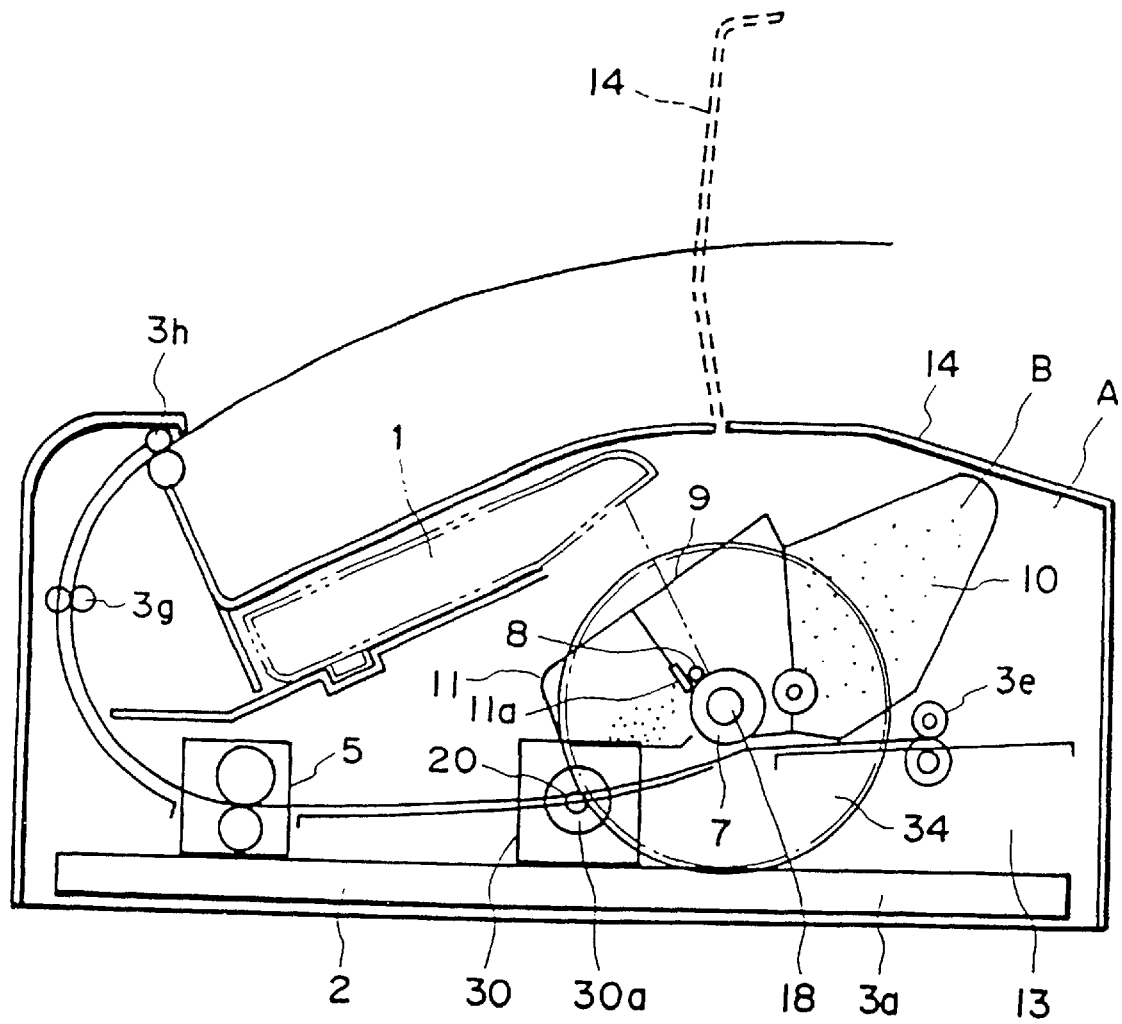
FIG. 12 is a sectional view of a driving system of a main assembly of an electrophotographic image forming apparatus according to an embodiment of the present invention.
Figure 13:
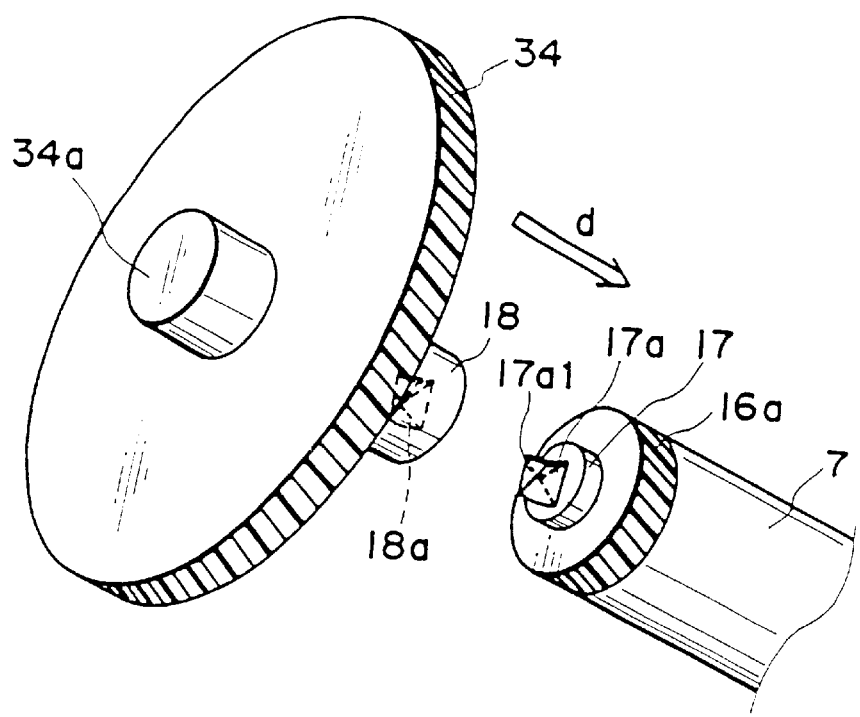
FIG. 13 is a perspective view of a coupling of a main assembly of the device and a coupling of the process cartridge, according to an embodiment of the present invention.
Figure 14:
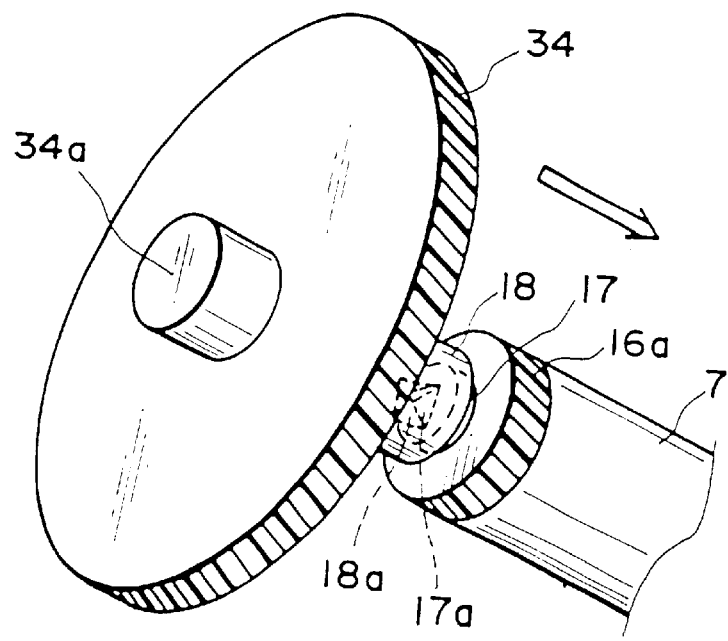
FIG. 14 is a perspective view of a coupling of a main assembly of a device and a coupling of a process cartridge according to an embodiment of the present invention.

On the other hand, the main assembly 13 of the image forming apparatus is provided with main assembly coupling means. The main assembly coupling means includes a female coupling shaft 18 (circular column configuration) at a position in alignment with the photosensitive drum rotation axis when the process cartridge B is inserted. The female coupling shaft 18 is a driving shaft integral with the large diameter gear 34 for transmitting the driving force from the motor 30 to the photosensitive drum 7, as shown in FIG. 12. The female shaft 18 is projected from a lateral edge of the gear 34 at a rotation center of the gear 34 (FIGS. 13 and 14). In this example, the large diameter gear 34 and the female coupling shaft 18 are integrally molded.

The gear 34 in the main assembly side is a helical gear. A tooth thereof has such an inclination angle that a thrust is produced in the direction of moving the female shaft 18 toward the male shaft 17 when the driving force is transmitted thereto from the helical gear 20 fixed to the shaft 30a of the motor 30. Therefore, when the motor 30 is driven upon image formation, the thrust is effective to move the female shaft 18 to the male shaft 17 to establish firm coupling between the recess 18a and the projection 17a. The recess 18a is provided at the rotation center of the female shaft 18 at an end of the female shaft 18.

In this embodiment, the driving force is transmitted directly from the gear 20 fixed to the motor shaft 30a to the gear 34, however a gear train may be used for deceleration and driving transmission, or use may be made with belt and pulley, a pair of friction rollers or a combination of timing belt and pulley.

Figure 15:
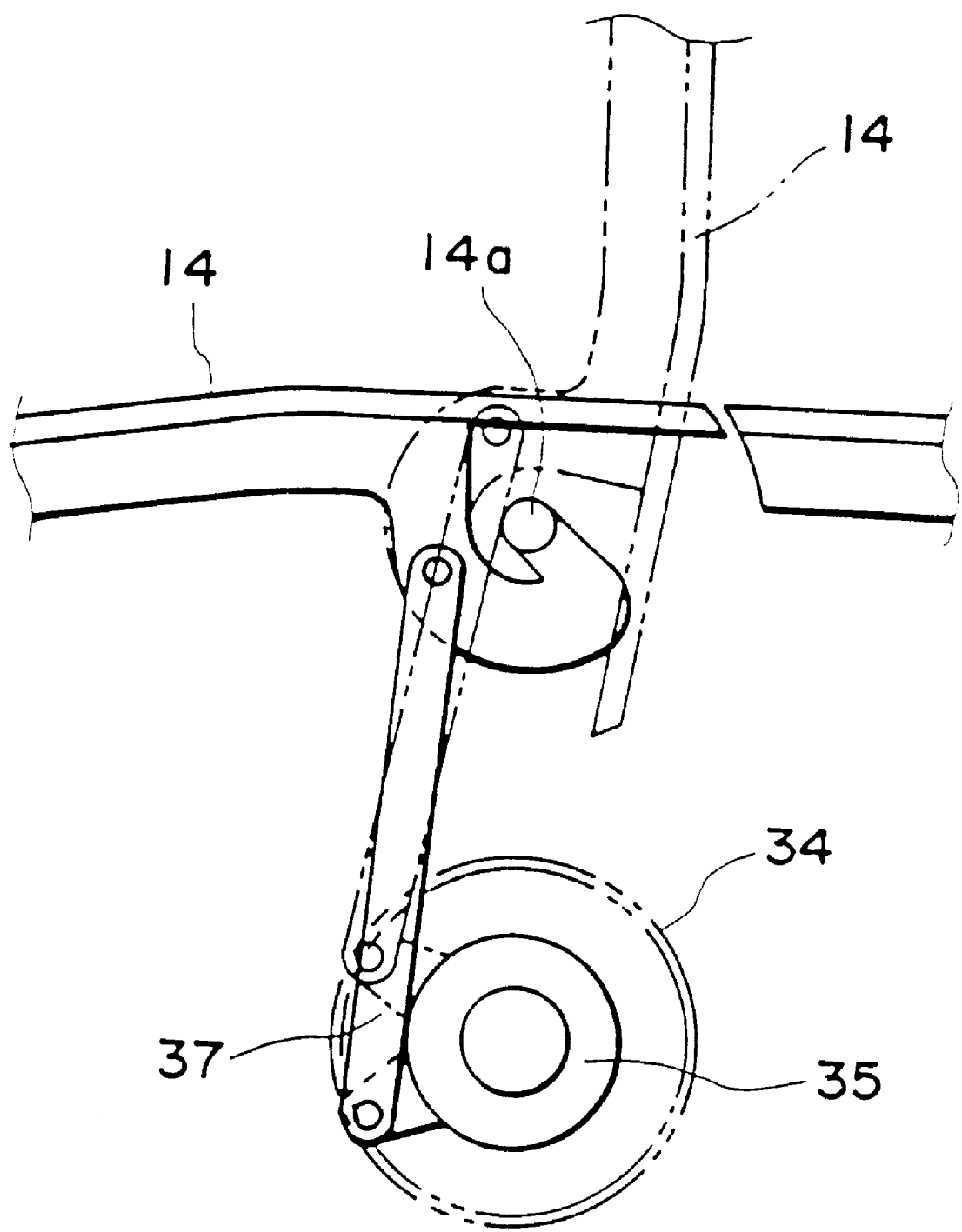
FIG. 15 is a sectional view of a structure of a coupling portion and a cover of the main assembly of the device according to an embodiment of the present invention.
Figure 16:
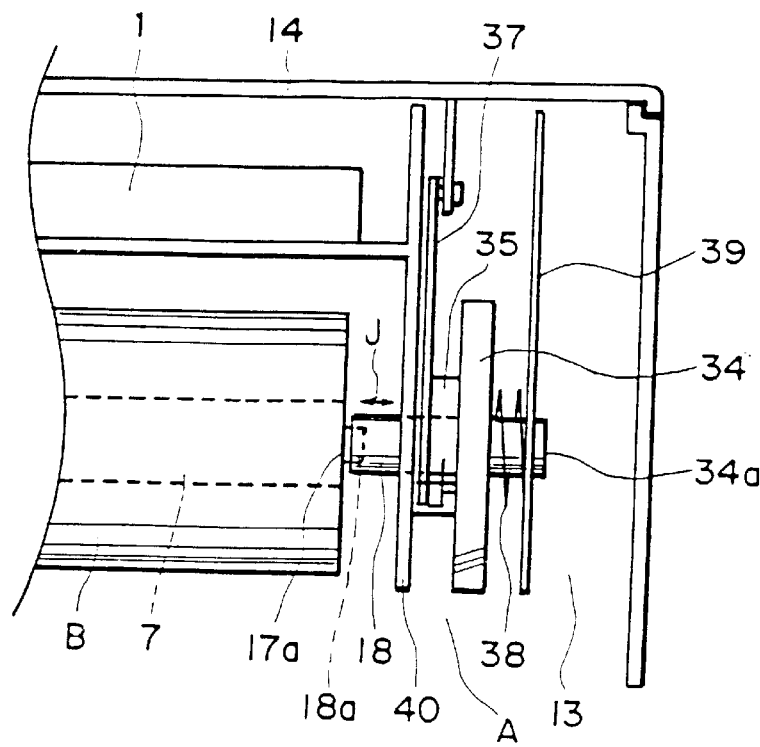
FIG. 16 is a side view of a structure of a female coupling shaft according to an embodiment of the present invention.
Figure 17:
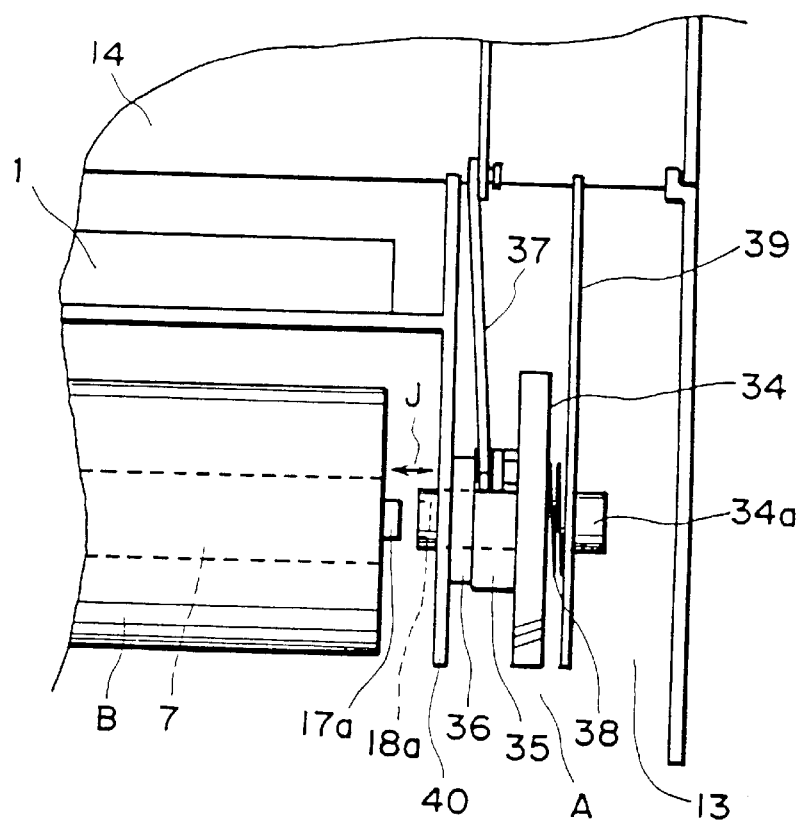
FIG. 17 is a side view of a structure of a female coupling shaft upon process cartridge mounting-and-demounting relative to the main assembly according to an embodiment of the present invention.

Referring to FIG. 15 to FIG. 17, the description will be made as to the structure for engaging the recess 18a and projection 17a in interrelation with the closing operation of the openable cover 14.

FIG. 15 is a view as seen in a direction of the axis of the photosensitive drum 7, wherein an outer cam 35 and an inner cam 36 (FIG. 17) are disposed between the gear 34 and the photosensitive drum 7 (unshown) and the cover 14 of the image forming apparatus and the outer cam 35 are connected by a rod 37, thus constituting a moving means. Designated by 40 is a side plate provided in the main assembly 13. Referring to FIGS. 16 and 17, designated by 34a is a shaft supporting portion for supporting the gear 34 on the side plate 39.

FIG. 16 is a view as seen from the right side. When the cover 14 is closed, the rod 37 and the outer cam 35 and so on take the position shown in this Figure, and they are coupled by the coupling projection 17a and the recess 18a to permit driving force transmission from the gear 34 to the photosensitive drum 7. When the cover 14 is opened, the cam 35 is pulled through the rod 37, as shown in FIG. 17, and therefore, the cam 35 is rotated to be contacted to the inner cam 36, thus moving the gear 34 away from the photosensitive drum 7. At this time, the gear 34 and the female coupling shaft 18 are pushed by the outer cam 35 to push the spring 38 mounted between itself and the fixing plate 39 and moves in the same direction, so that the recess 18a becomes away from the projection 17a to release the coupling, by which the cartridge B demounting is enabled. When the cover 14 is closed, the cam 35 rotates in the opposite direction and is pushed by the spring 38 so that the gear 34 is reset to the position shown in FIG. 16 to enable the driving transmission. With this structure, the mounting-and-demounting of the cartridge B and the drive transmission are disabled and enabled in response to the opening and closing of the cover 14.

In this example, the cover 14 is opened and closed when the process cartridge B is mounted to or demounted from the main assembly of the apparatus. In interrelation with the opening and closing of the cover 14, the recess 18a moves in a horizontal direction (arrow j direction). When the process cartridge B is mounted or demounted relative to the main assembly, the coupling (between 17a and 18a) between process cartridge B and the main assembly 13 of the apparatus is assuredly disengaged. Therefore, the mounting-and-demounting of the process cartridge B relative to the main assembly 13 can be smoothly carried out. In this example, the recess 18a is urged toward the process cartridge B by the spring 38. Therefore, even if the projection 17a and the recess 18a are not aligned, and therefore abutment occurs therebetween, and they are not engaged, they are engaged instantaneously upon the rotation of the recess 18a.

The description will be made as to the configurations of the projection 17a and the recess 18a which are engaging portion of the coupling means.

The female coupling shaft 18 provided in the main assembly 13 is movable toward the rotational shaft, as described above, but is not movable in the radial direction. The process cartridge B is mounted in the main assembly 13 of the apparatus such that it is movable in the longitudinal direction and radial direction of the photosensitive drum 7.

More particularly, when the process cartridge B is mounted in the main assembly 13 of the device, a portion of the drum shaft 25a (bearing 12c2) (FIGS. 4 and 9) formed on the flange 25 mounted adjacent the other longitudinal end of the photosensitive drum 7 is received by the u groove 15b (FIG. 5) of the main assembly 13 and is engaged therewith without gap, so that it is correctly positioned, and the spur gear 25b integrally molded with the flange 25 is meshed with a gear (not shown) for transmitting the driving force to the transfer roller 4. On the other hand, at the longitudinal end of the photosensitive drum 7 (driving side), the projection 24a of the cleaning frame 12c is supported by the recess 15d of the main assembly 13. By closing the cover 14, the recess 18a is moved in a horizontal direction and is received by the projection 17a (FIG. 8 (a)).

The positioning and driving transmission at the driving side (coupling side) are as follows.

When the main assembly driving motor 30 is rotated, the female coupling shaft 18 is moved toward the male coupling shaft 17 (arrow d in FIG. 13), and they are engaged when the phases of the projection 17a and the recess 18a are matched (in this example, since the projection 17a and recess 18a have substantially equilateral triangular configurations, the phases thereof match at every 120°). Then the rotation force is transmitted from the main assembly 13 of the apparatus to the process cartridge B (from the state of FIG. 17 to the state of FIG. 16).

Since the sizes of the equilateral triangles are different, more particularly, the size of the triangle of the recess 18a is larger than that of the projection 17a (as shown in FIG. 8 (a)), the projection 17a is smoothly engaged into the recess 18a with the gap therebetween. The accuracy of the positioning between the male coupling shaft 17 and female coupling shaft 18 may be rough at the time of the engaging action.

In this example, the projection length of the circular projection 24a is larger than that of the projection 17a (FIG. 9). Therefore, when the projection 17a and the recess 18a are engaged, the inside surface of the circular projection 24a is engaged with the outer peripheral surface of the female coupling shaft 18 to guide the engagement therebetween.

When the female coupling shaft 18 is rotated with the projection 17a engaged with the recess 18a for image formation, the inside surfaces 18a1 of the recess 18a are engaged to the apex lines 17a1 of the equilateral triangular prism of the projection 17a (as shown in FIG. 8) to permit the transmission of the driving force. At this time, the male shaft 17 instantaneously moves so that the inside surfaces 18a1 of the recess 18a are contacted to the edge lines 17a1 of the projection 17a at regular positions (equidistantly) from the state of FIG. 8 (a) to the state of FIG. 8 (b). Since the projection 17a and the recess 18a are both substantially equilateral triangles, the male shaft 17 and the female shaft 18 are brought into the coaxial state with each other with uniform contact forces. Immediately after the projection 17a is brought into engagement with the recess 18a, the rotation center of the projection 17a is not aligned with the rotation center X2 of the recess 18a (FIG. 8 (a)). However, when the recess 18a starts to rotate, and it is contacted to the edge line 17a1 of the projection 17a at 3 points (lines), the rotation centers X1 and X2 are substantially aligned.

Thus, the coupling shaft 17 and 18 are automatically axis aligned by the rotation of the motor 30 (self-alignment). Furthermore, by the driving force transmission to the photosensitive drum 7, the process cartridge B is rotated, by which the abutment portion 12c1 provided on the top surface of the cleaning frame 12c of the process cartridge B (FIGS. 3 and 4) is abutted to the abutment portion 13a (FIG. 1) fixed to the main assembly 13 of the image forming apparatus, so that the process cartridge B is precisely positioned to the main assembly A of the image forming apparatus.

When the process cartridge is not driven (non-image formation), the gap is provided between the projection 17a and recess 18a in the rotation radius direction (radial direction), the engagement between the couplings and the mounting and demounting of the process cartridge relative to the main assembly are made easier. Additionally, the contact force at the coupling engagement portion is stabilized, so that the wobble and vibration at this position can be suppressed.

In this example, the coupling projection and recess have substantially equilateral triangular configurations, but a similar advantage can be provided if the configuration is an equilateral polygonal. The use of an equilateral polygonal configuration is preferable since the positioning is correct, but any polygonal configurations are usable if the engagement is possible and pulling engagement is possible.

When the comparison is made between the coupling projection and recess, the projection is easily damaged, and the strength thereof is smaller than the recess. In this example, the coupling projection is provided in the process cartridge B which is exchangeable, and the coupling recess is provided in the main assembly 13 which is required to have a higher strength.

The process cartridge B of this embodiment is summarized as follows. The process cartridge B of this example is detachably mountable relative to a main assembly of an electrophotographic image forming apparatus A comprising a motor 30, a main assembly gear 34 for receiving the driving force from the motor, and a twisted polygonal hole 18a integrally rotatable with the main assembly gear, the hole being formed at the center of the main assembly gear, the electrophotographic image forming apparatus A being capable of forming an image on the recording medium 2. The process cartridge comprises the electrophotographic photosensitive drum 7, the process means actable on the electrophotographic photosensitive drum (charging roller 8, developing roller 10, cleaning blade 11a), and a twisted polygonal prism projection (projection 17a) engageable with the twisted polygonal hole of the main assembly, the projection being provided at the end of the electrophotographic photosensitive drum. The process cartridge B is mounted to the main assembly 13 of the main assembly, and the polygonal prism projection 17a is engaged with the recess of the main assembly, and when the gear 34 is rotated, the rotational driving force is transmitted to the photosensitive drum.

The projection 17a is projected from the end of the shaft portion 17 projected outwardly in the longitudinal direction of the drum from the rotation center position of the drum 7. The shaft portion functions to rotatably support the drum 7 on the cartridge frame 12c.

The shaft portion 17 is provided at the central portion of the helical gear 16a, and at the opposite end from the helical gear 16a side, an engaging portion 16b for engagement with the inside surface of the electrophotographic photosensitive drum 7 is provided. The projection 17a, the shaft portion 17, the helical gear 16a, and the engaging portion 16b are integrally molded of a resin material. The helical gear functions to transmit the rotation force to the developing roller 10a as the process means.

Furthermore, there is provided a circular outer wall 24a enclosing the polygonal prism projection 17a, or an arcuate configuration outer wall along a part of the polygonal prism projection. The outer wall 24a functions as a guide for the engagement between the hole 18a and the projection 17a by relative movement therebetween.

The outer diameter D1 of the electrophotographic photosensitive drum 7, the outer diameter F of the shaft portion 17, and the diameter C of the circumscribed circle of the polygonal prism projection 17a, satisfy $D1 > F \geq C$.

The outer diameter F of the shaft portion 17, the diameter C of the circumscribed circle of the polygonal prism projection 17a, the dedendum diameter G of the gear 16a of the electrophotographic photosensitive drum 7, and the inner diameter D2 of the electrophotographic photosensitive drum 7, satisfy $G > D2$ and $G > F \geq C$.

The outer diameter D1 of the electrophotographic photosensitive drum 7, and the dedendum circle diameter L of the main assembly gear 34, L is preferably not less than approx. 1.0 times D1 and not more than 5.0 times D1. The relation is properly selected by one skilled in the art in consideration of the space of the main assembly of the device and the desired image quality. The dimensions are not limiting. In this example, it is approx. 3 times.

The module of the main assembly gear 34 is approx. 0.4–0.7. The dedendum diameter L of the main assembly gear 34 of the device is approx. 30 mm–150 mm, and the number of teeth of the main assembly gear 34 is approx. 40 teeth to 400 teeth. They are properly selected by one skilled in the art in consideration of the space in the main assembly and desired image quality. The figures are not limiting. In this example, the module of the gear 34 is approx. 0.5, and L is approx. 100 mm, and the number of the teeth of the gear 34 is 200 teeth.

The positioning of the process cartridge B relative to the main assembly 13 during the image formation (driving transmission) is summarized as follows.

First, the process cartridge B is positioned by the bearing 12 being snugly fitted in the U groove 15$d$ during the non-image formation. On the other hand, the projection 24$a$ is simply supported by a receptor portion 15$c$. During the image formation, the process cartridge B is positioned by the projection 17$a$ being attracted by the recess 18$a$ of the main assembly 13 and being engaged with the projection 17$a$. Namely, during the image formation, the process cartridge B is positioned by the U groove 15$b$ at one longitudinal end, and by the recess 18$a$ at the other end. In this example, the photosensitive drum 7 is movable in the longitudinal direction (approx. 0.1 mm–1.0 mm). When the projection 17$a$ is attracted to the recess 18$a$, the end portion 16$c$ of the drum flange 16 (FIGS. 7, 8 and 9) is brought into contact to the end portion 24$b$ of the bearing 24. The process cartridge B, which is mounted movably relative to the main assembly side plate or mounting guides 15$a$ and 15$c$ with play of approx. 0.1–3 mm) in consideration of assembly tolerance, is pulled toward the photosensitive drum 7 in the longitudinal direction and in the radial direction, thus moving in an inclined upward direction. In the case the end portion 16$c$ is in contact with the end portion 24$b$ at the beginning, or when the photosensitive drum 7 does not have play in the longitudinal direction, the process cartridge B is pulled to the photosensitive drum 7 immediately in its longitudinal direction and in the radial direction, thus moving in an upward inclined direction.

During the image formation operation, the process cartridge B receives the rotation force in the same direction as the rotation direction of the photosensitive drum 7. By this rotation force, the contact portion 12$c1$ is contacted to the fixed portion 13$a$.

Accordingly, the process cartridge B is correctly positioned relative to the main assembly 13 of the apparatus in both the longitudinal direction and the radial direction during the image formation operation.

Figure 21:
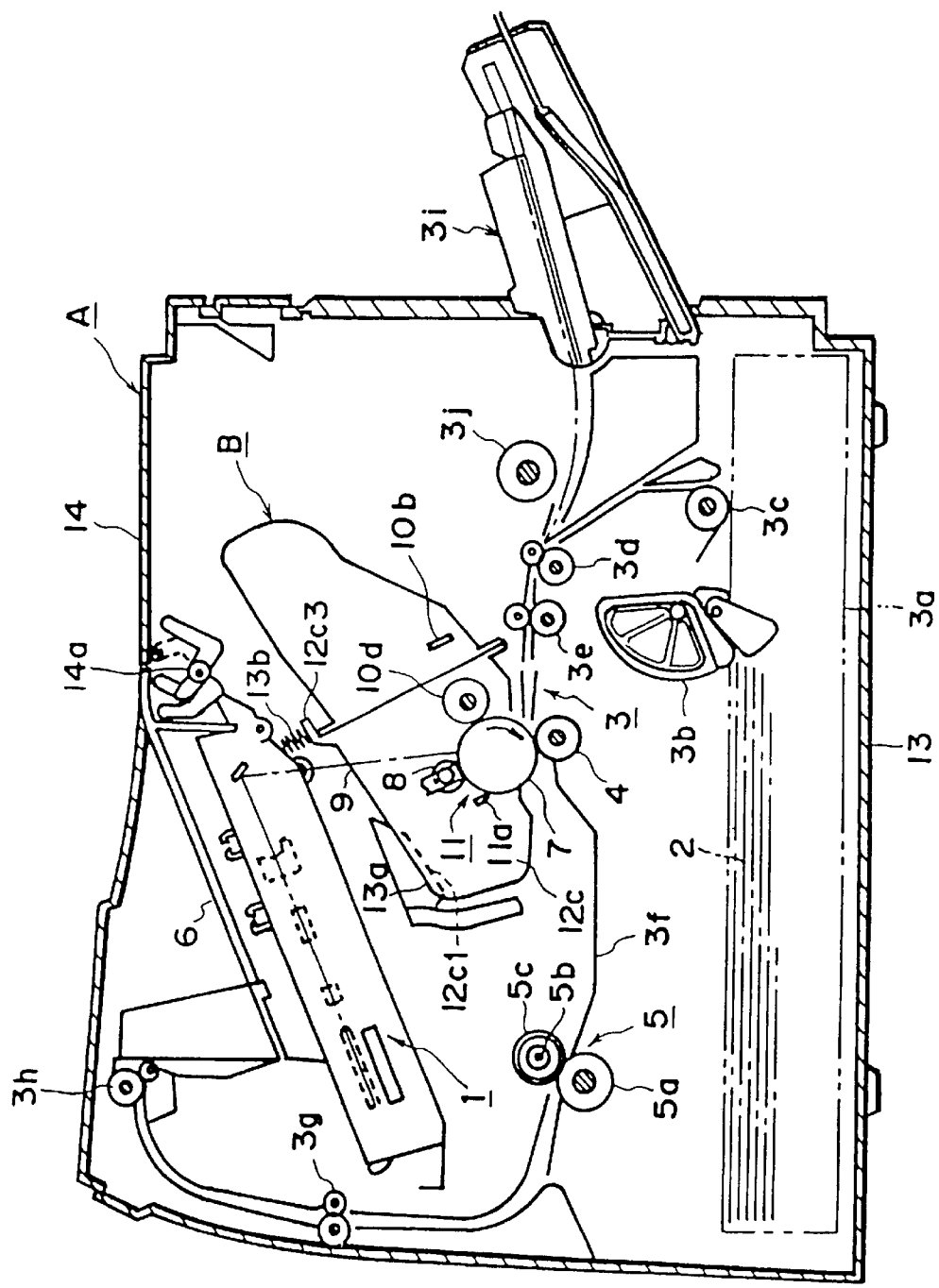
FIG. 21 is a sectional view of an electrophotographic image forming apparatus according to an embodiment of the present invention.

When the process cartridge B is pushed by an elastic member as in FIG. 21, for example, the process cartridge B may not move in the longitudinal direction of the drum 7, depending on the strength of the elastic force provided by the elastic member. Even in that case, when the drive transmission starts, the process cartridge B moves in the radial direction (substantially upward) so that it is correctly positioned relative to the main assembly. In this case, even if the drum 7 does not involve play in the longitudinal direction, the process cartridge B is correctly positioned relative to the main assembly.

Referring back to FIG. 18, it will be understood that the coupling mechanism is summarized as follows. The driving rotatable member 18$a$ for receiving driving force from the motor is provided with a twisted recess or projection having a non-circular cross-section and substantially coaxial with a rotation axis X2 of the drive rotatable member 18$a$. The member to be driven or the image bearing member is provided with a twisted projection or recess 17$a$ provided at a longitudinal end of the image bearing member, having a non-circular cross-section and substantially coaxial with a rotation axis of the image bearing member. The projection or recess of the image bearing member 17$a$ has such a dimension and configuration that it can take a first relative rotational position (FIG. 18($a$), for example) with respect to the recess or projection of the driving rotatable member 18$a$ in which relative rotational movement therebetween is permitted, and a second relative rotational position (FIG. 18($b$), for example) with respect to the recess or projection of the driving rotatable member 18$a$ in which relative rotational movement is prevented in one rotational direction (indicated by arrows in FIG. 18($b$)), while the rotation axis X2 of the driving rotatable member 18$a$ and the rotation axis X1 of the image bearing member are substantially aligned with each other.

It is preferable that the recess or projection of said driving rotatable member and the projection or recess of the image bearing member are contacted substantially at three twisted points (lines). It is further preferable that the three points constitute a substantially equilateral triangle.

Embodiment 2

Figure 19:
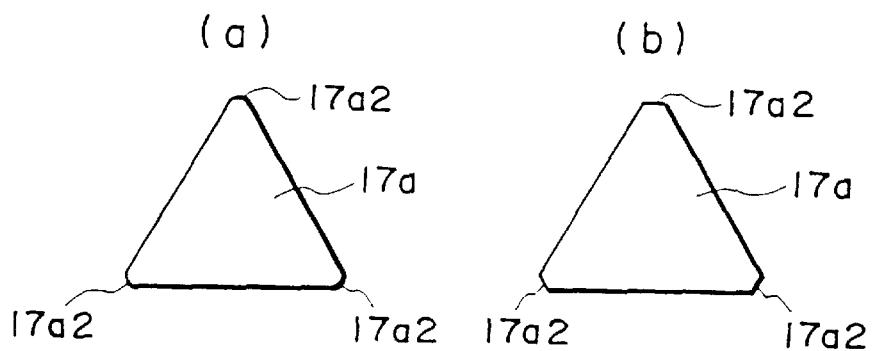
FIGS. 19(*a*) and 19(*b*) are sectional views of a coupling projection according to an embodiment of the present invention.

Referring to FIG. 19, the description will be made as to embodiment 2 of the projection 17$a$ of the male coupling shaft 17. The fundamental structures of the process cartridge and the image forming apparatus are the same as in embodiment 1, and therefore, the same reference numerals as in embodiment 1 are assigned to the elements having the corresponding functions, and detailed descriptions thereof are omitted for simplicity.

The coupling projection 17$a$ of FIG. 19 is different from that in embodiment 1 in that the apexes 17$a2$ of the substantially equilateral polygonal prism shape of the projection (it is substantially an equilateral triangle shape in FIG. 19) are beveled. The beveling includes rounding as shown in FIG. 19($a$) and straight cutting as shown in FIG. 19($b$).

With this structure, the collapse of the apexes of the projection 17$a$ during handling of the process cartridge B can be avoided. During the driving, the deformation and deflection of the apexes due to insufficient strength can be avoided. Thus, the decrease of the alignment accuracy between the male shaft 17 and the female shaft 18 can be prevented, and the wobble and vibration at the coupling portion can be avoided.

In FIG. 19($a$), as will be understood when this configuration is introduced in the projection 17$a$ of FIG. 18($b$) the portions contacted to the inner surface of the recess are not the outermost points of the configuration of FIG. 19($a$), but are portions slightly deviated therefrom (at each apex portion). From the standpoint of axis alignment, it is preferable that such deviated three contact points constitute a substantially equilateral triangle.

Similarly, in FIG. 19($b$), it is preferable that the three points constitute a substantially equilateral triangle.

For the same reason, in a polygonal projection (polygonal recess) example, it is preferable that the projection and recess are contacted at three points which constitute a substantially equilateral triangle, from the standpoint of the axis alignment.

In the case of FIG. 19($a$), each contact point (actually a twisted line) in the cross-section may have a certain width. In such a case, the centers or one side end of the widths are deemed as the points to constitute the triangle.

Embodiment 3

Figure 20:
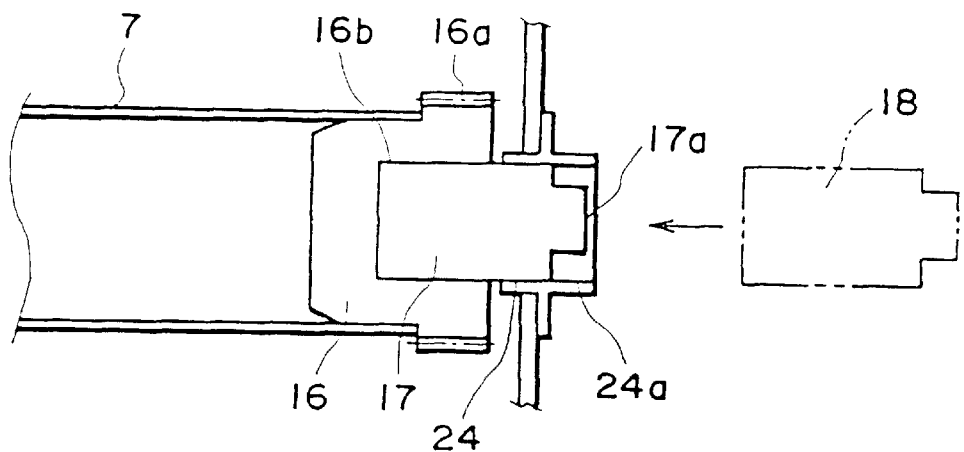
FIG. 20 is a sectional view of a process cartridge side coupling portion according to an embodiment of the present invention.

Referring to FIG. 20, the description will be made as to embodiment 3 of the projection of the male coupling shaft 17. The fundamental structures of the process cartridge and the image forming apparatus are substantially the same as in embodiment 1. The same reference numerals as in embodiment 1 are assigned to the elements having the corresponding functions, and detailed descriptions thereof are omitted for simplicity.

In embodiment 1, the flange 16 of the photosensitive drum 7 and the male coupling shaft 17 are integral, but they may be separate members, which are incorporated in the process cartridge B, respectively.

When the male coupling shaft 17 and the flange 16 are separate members, as in this example, the male coupling shaft 17 can be mounted into the engaging portion 16b of the flange 16 by press-fitting or the like after the photosensitive drum 7 with the flange 16 is incorporated in the frame 12c, so that the photosensitive drum 7 may not be assembled into the frame 12c in an inclined direction.

Embodiment 4

Referring to FIG. 21, the description will be made as to embodiment 4 having a different positioning structure of the process cartridge to the main assembly of the image forming apparatus, using the coupling structure of the present invention. The fundamental structures of the process cartridge and the image forming apparatus are substantially the same as in embodiment 1. The same reference numerals as in embodiment 1 are assigned to the elements having the corresponding functions, and detailed descriptions thereof are omitted for simplicity.

As shown in FIG. 21, the main assembly 13 of the image forming apparatus is provided with an elastic member 13b for urging the process cartridge B in the rotation direction of the photosensitive drum 7. The elastic member 13b is contacted to the contact portion 12c 3 of the cleaning frame 12c of the process cartridge B while the process cartridge B is in the main assembly in place, and it applies the rotation force in the same direction as the rotation direction of the photosensitive drum 7 to the process cartridge B. The process cartridge B receiving the rotation force tends to rotate in the rotation direction of the photosensitive drum 7 (clockwise direction in FIG. 21), but is stopped by the abutment between the abutment portion 12c1 of the frame 12c and the abutment portion 13a of the main assembly. This is effective to prevent the vibration, in the rotation direction, of the process cartridge B urged in the rotation direction of the photosensitive drum 7 by the coupling driving force, due to the internal load variation or the like. The contact portion 12c3 is provided at each of two positions, namely, adjacent one end side and other end side in the longitudinal direction of the photosensitive drum 7 on the top surface of the cleaning frame 12c (FIGS. 3 and 4).

Embodiment 5

Figure 22:
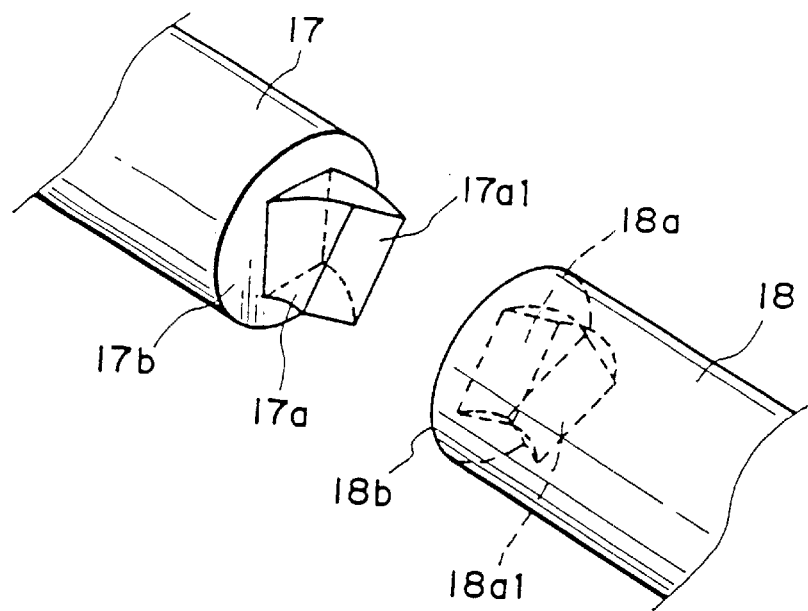
FIG. 22 is a perspective view of a recess and a coupling projection according to an embodiment of the present invention.

Referring to FIG. 22, another embodiment of the coupling structure will be described. The fundamental structures of the process cartridge and the image forming apparatus are substantially the same as in embodiment 1. The same reference numerals as in embodiment 1 are assigned to the elements having the corresponding functions, and detailed descriptions thereof are omitted for simplicity.

In this example, as shown in FIG. 22, the projection 17a of the male coupling shaft 17 and the recess 18a of the female shaft 18 have a substantially rectangular configuration section which is twisted in the rotation direction of the shaft. Similarly to embodiment 1, the durable coupling recess 18a is provided in the main assembly 13 of the image forming apparatus. With this structure, when the driving is transmitted while the coupling is in engagement, the force is produced so that the female coupling shaft 18 pulls the male shaft 17 in the axial direction due to the twisting direction thereof, by which the projection end surface 17a1 of the male coupling shaft 17 is abutted to the recess bottom surface 18a1 (or, the male shaft end surface 17b is abutted to the end surface 18b of the female shaft).

Since the position of the process cartridge B is constant in the direction of the coupling shaft in the main assembly A of the image forming apparatus during the driving operation, the vibration of the process cartridge can be suppressed.

In this example, the cross-sectional configurations of the projection 17a of the coupling shaft and the recess 18a are substantially rectangular configurations, but another polygonal prism shape is usable if the engagement is established when the coupling recess is rotated.

When the process cartridge B is demounted from the main assembly, the motor 30 may be rotated in the opposite direction, the coupling engagement is automatically released due to the thrust between the gear 33 and the helical gear 34. In this case, there is no need of using the coupling release mechanism as in embodiment 1.

Embodiment 6

Figure 23:
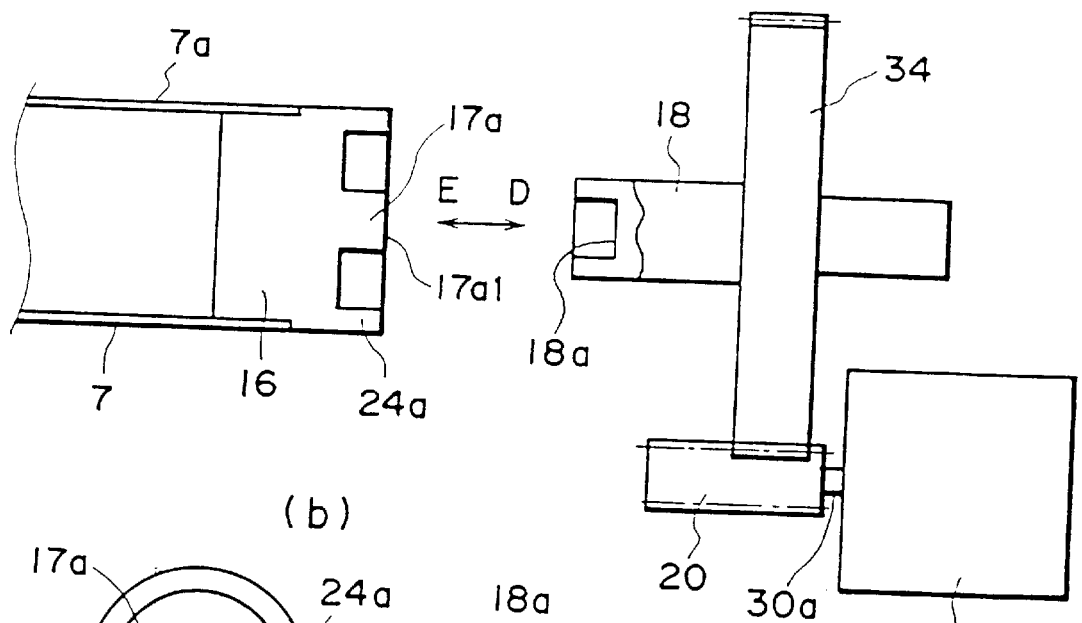
FIG. 23(*a*) is a cross-sectional view and FIG. 23(*b*) is a top plan view of a-male shaft in the form of a twisted triangular prism provided on the process cartridge and an engageable female shaft provided in the main assembly of a device, according to an embodiment of the present invention.
Figure 23:
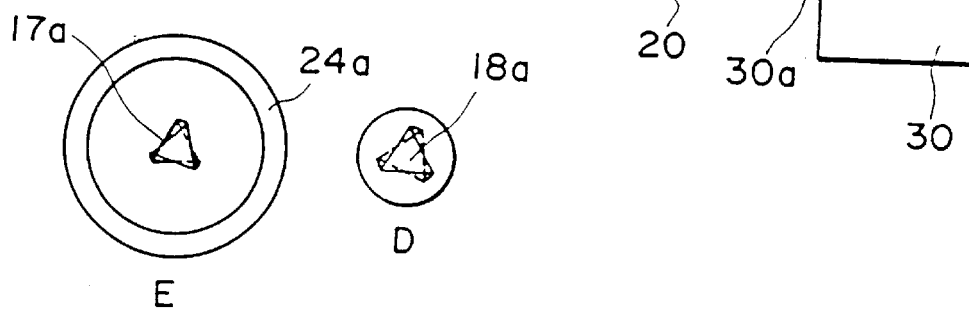

Referring to FIG. 23, the description will be made as to a further embodiment. The embodiment of FIG. 23 is different from embodiment 1 in that the gear is not provided on the drum flange 16.

The coupling structure shown in FIGS. 23(a) and (b), is such that the main assembly side coupling means is of a female coupling shaft 17 of polyacetal (POM), and the coupling means of the cartridge side engageable therewith is of a male coupling shaft 18 of POM. A cylindrical wall portion 24 concentric with the photosensitive drum 7 is formed integrally with the flange 16 is provided around the male coupling shaft 18. FIG. 23(b) are views as seen in the directions D and E of FIG. 23(a).

By the provision of a wall portion 24 having substantially the same height as the projection 18a around the male shaft 18, the projection 18a is not projected out beyond the cartridge frame, so that the damage of the end portion f the projection 18a can be prevented.

The cylindrical wall portion 24 may also function as a guide for facilitating the mounting of the process cartridge B to the image forming apparatus A (FIG. 6, guide c), as described in the foregoing.

Embodiment 7

Figure 24:
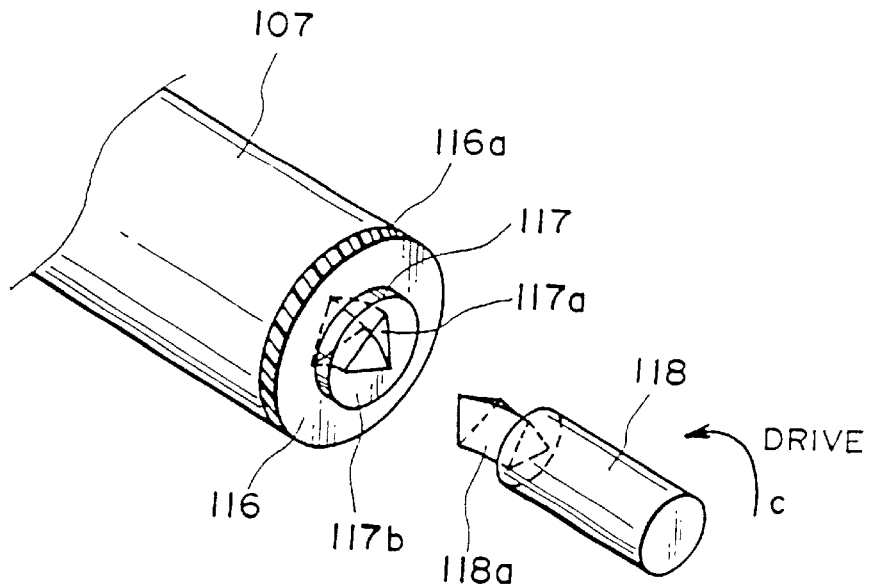
FIG. 24 is a perspective view of a twisted recess having a cross-section in the form of a triangle shape on the process cartridge, and a projection in the form of a complementary twisted triangular prism in the main assembly of the device, according to an embodiment of the present invention.
Figure 25:
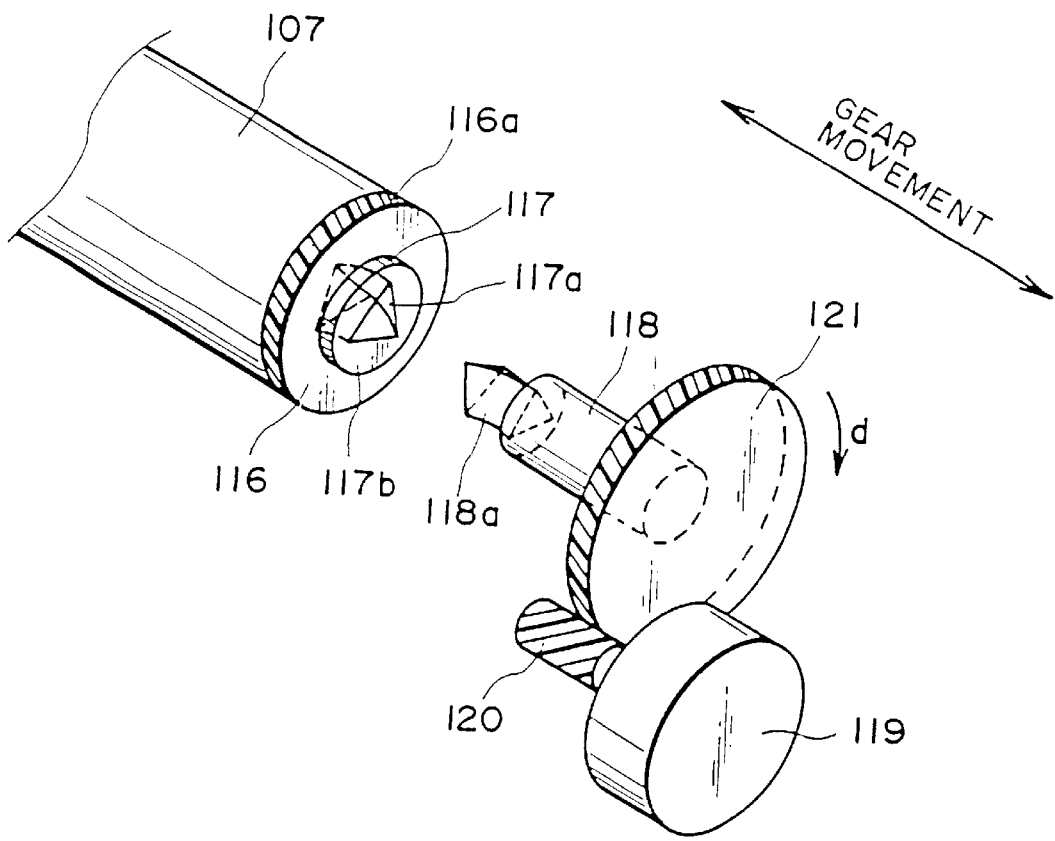
FIG. 25 is a perspective view of a driving mechanism of the coupling of FIG. 24.

Referring to FIGS. 24 and 25, another embodiment will be described. In this embodiment, as contrasted to the above-described embodiment, the drum flange 116 of the photosensitive drum 7 is provided with a female shaft 117, and the large diameter gear 121 of the main assembly 13 of the apparatus is provided with a male shaft 118. The rotation accuracy can be improved, with this structure, too.

As shown in FIG. 24, the substantially positive triangular prism of the projection 118a of the male coupling shaft 118 is twisted in the rotation direction, and the recess 117a of the female coupling shaft 117 is twisted correspondingly in the rotation direction. A seat 117b is provided at the end surface of the female coupling shaft 117.

By the twisting of the engaging portion in the rotation direction, the male coupling shaft 118 pulls the female shaft 117 until it is abutted to the seat 117b when the male coupling shaft 118 is rotated in the direction c for image formation while they are engaged. As a result, the combination therebetween is further assured.

When the process cartridge B is demounted from the main assembly 13, motor 119 may be rotated in the opposite direction indicated by arrow d, by which the engagement of the coupling is automatically released by the thrust produced by the meshing between the pinion gear 120 having the helical teeth and the transmission gear 121, as shown in FIG. 25.

In this example, if the tolerable transmission torque of the female shaft 117 is smaller than the tolerable transmission torque of the male shaft 118, the damage of the male shaft 118 can be prevented.

For example, the female coupling shaft provided in the cartridge is made of polyacetal (POM), and the male coupling shaft constituted in the main assembly is made of zinc die-cast. By doing so, even if an abnormal torque is produced, the damage of the male shaft is prevented since the tolerable transmission torque of the male coupling shaft of the main assembly side is large.

This embodiment is the same as embodiment 1 except that the female shaft is provided in the drum flange, and the male shaft is provided in the main assembly. Therefore, the embodiments of the electrophotographic image forming apparatus, the process cartridge, the drive transmission part and the electrophotographic photosensitive drum are the same as those of embodiment 1, except that the male shaft of the drum flange is replaced with the female shaft, and the female shaft of the gear of the main assembly is replaced with the male shaft, and therefore, the description of such embodiments are omitted for simplicity.

However, the process cartridge will be described briefly. It is a process cartridge B which is detachably mountable to a main assembly 13 of an electrophotographic image forming apparatus A. The electrophotographic image forming apparatus A comprises a motor 30 (119), the main assembly helical gear 34 (121) for receiving the driving force from the motor 30 (119), and a twisted triangular prism projection 118a integrally rotatable with the main assembly helical gear provided at the main assembly helical gear of the main assembly helical gear 34 (121). The electrophotographic image forming apparatus A operates to form an image on the recording medium. The process cartridge B comprises cartridge frames 12a, 12b and 12c, the electrophotographic photosensitive drum 7 (107), the charging roller 8 for charging the electrophotographic photosensitive drum 7 (107), the cleaning blade 11a for removing the residual toner from the electrophotographic photosensitive drum 7 (107), the developing roller 10d for developing the latent image formed on the electrophotographic photosensitive drum 7 (107), and a twisted triangular hole 117a engageable with the projection 118a provided at a longitudinal end of the electrophotographic photosensitive drum 7 (107). The process cartridge B is mounted to the main assembly, and when the main assembly helical gear 34 (121) is rotated with the hole 117a engaged with the projection 118a, the rotational force is transmitted from the main assembly helical gear 34 (121) to the drum 7 (121) while the hole 117a is kept pulled toward the projection 118a. The hole 117a is formed as a recess at a leading edge of the shaft portion 17 (117) provided at the central portion of the drum helical gear 16a (116a). The drum helical gear 16a (116a) functions to transmit the rotation force to the developing roller 10d. The shaft portion 17 (117) functions to rotatably support the electrophotographic photosensitive drum 7 (107) on the cartridge frame 112c. The drum helical gear 16 (116a) of the hole 117 and the shaft portion 17 (117) are integrally formed from resin material. Outer diameter D1 of the electrophotographic photosensitive drum 7 (107), the outer diameter F of the shaft portion, and the diameter C of the circumscribed circle of the hole configuration 117a, satisfy D1>F>C.

The outer diameter F of the shaft portion 17 (117), the diameter C of the circumscribed circle of the hole configuration, the dedendum diameter G of the gear 16a of the electrophotographic photosensitive drum 7, and the inner diameter D2 of the electrophotographic photosensitive drum 7, satisfy G>D2 and G>F>C. The outer diameter D1 of the electrophotographic photosensitive drum 7 (107), and the dedendum circle diameter L of the main assembly gear 34 (121), L is preferably not less than approx. 1.0 times D1 and not more than 5.0 times D1. The module of the main assembly gear 34 (121) is approx. 0.4–0.7. The dedendum diameter L of the main assembly gear of the device is approx. 30 mm–150 mm, and the number of teeth of the main assembly gear 34 is approx. 40 teeth–400 teeth.

In this example, the direction of twisting of the projection 118a as seen from the photosensitive drum 7 (107) is the same as the rotation direction of the photosensitive drum 7 (107) in the direction from the base portion of the projection 118a toward the end, and that of the hole 117a is the same in the direction from the inlet of the hole 117a toward the inside thereof. The twisting direction of the drum flange 16a (116a) is opposite from the twisting direction of the hole 117a.

Embodiment 8

Figure 26:
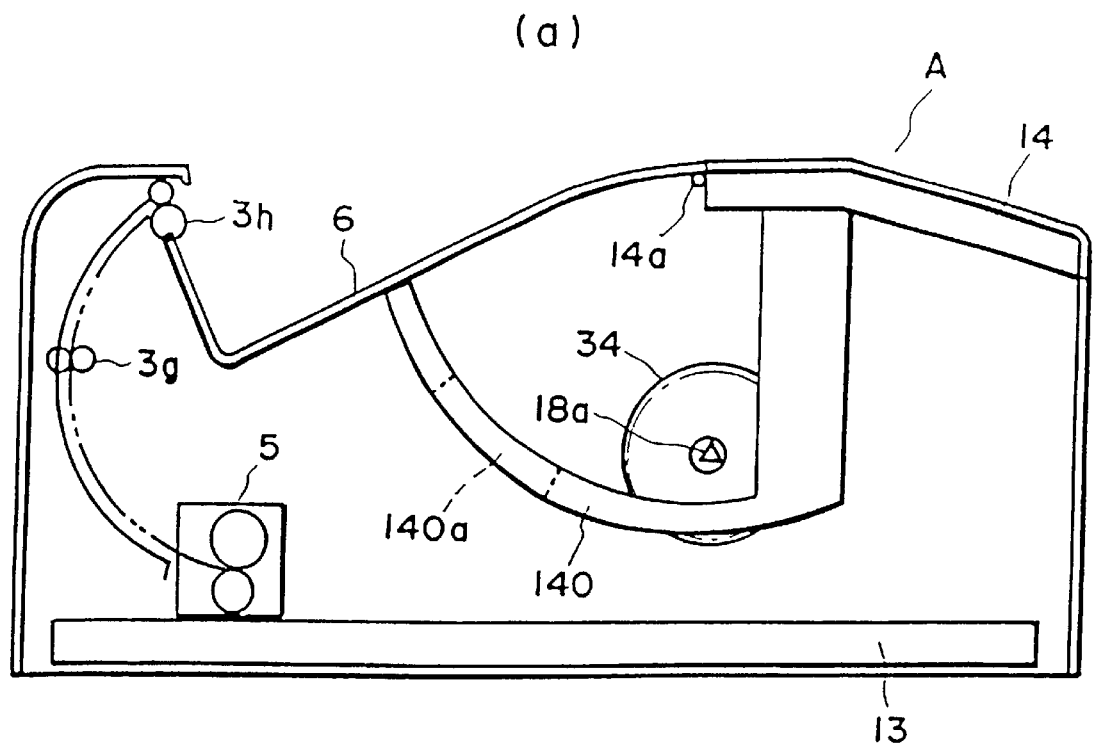
FIGS. 26(*a*) and 26(*b*) illustrate an interrelation mechanism of a driving means and an openable cover according to an embodiment of the present invention.
Figure 26:
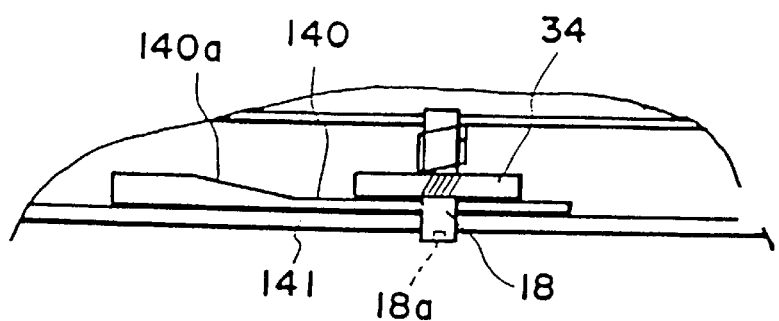

In embodiment 1, when the cover 14 is opened, the rod 37 and the cam 35 are operated in interrelation therewith to release the engagement between the coupling projection 17a and the recess 18a. The coupling release structure may be as disclosed in FIGS. 26 and 27.

Figure 27:
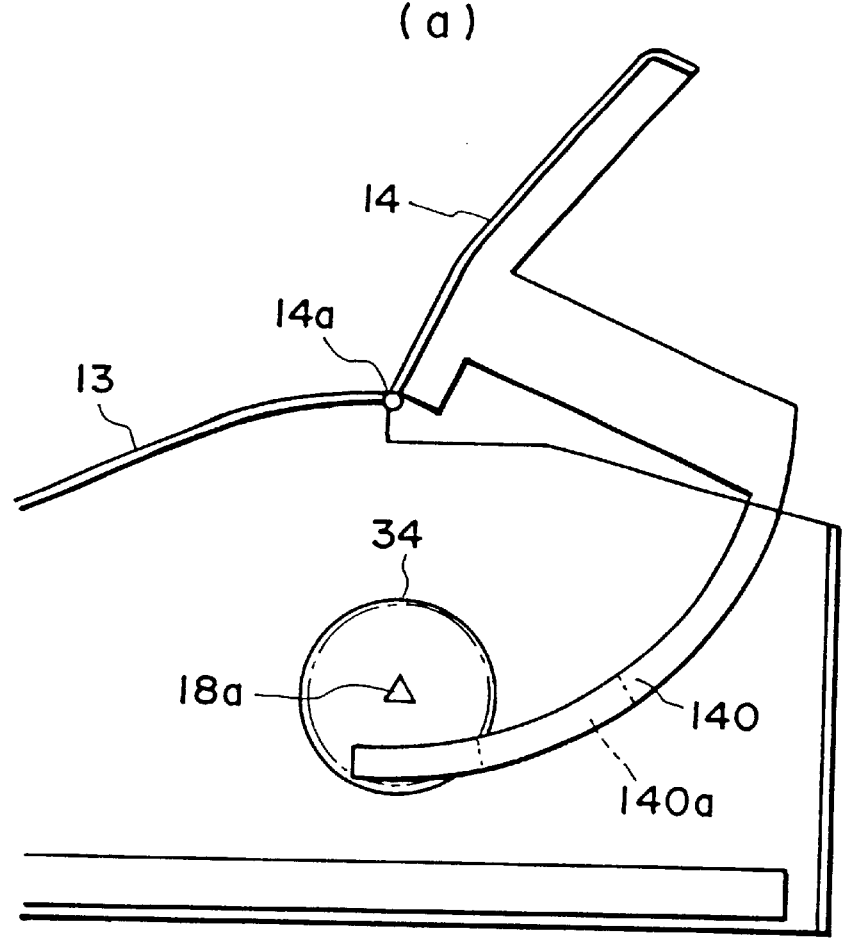
FIGS. 27(*a*) and 27(*b*) illustrate an interrelation mechanism of driving means and an openable cover according to an embodiment of the present invention.
Figure 27:
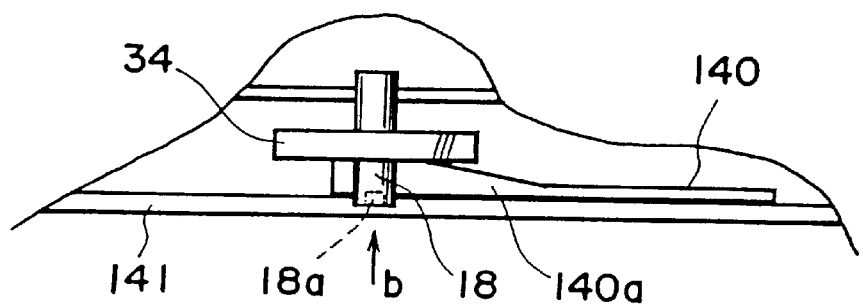

The openable cover 14 is provided with an arcuate releasing member 140 at the center of the shaft 14a, as shown in FIG. 26(a), and the leading edge of the releasing member 140 is formed into a cam portion 140a having a gradually increasing thickness, as shown in FIG. 26(b). As shown in FIGS. 27(a) and (b), when the cover 114 is opened to demount the process cartridge B, the cam portion 140a enters the space between the wall portion 141 and the gear 34 integral with the female shaft 18 to push the side surface of the gear 34 out in the direction indicated by arrow b in FIG. 27. By this, the female shaft 18 is retracted from the wall portion 141 so that the engagement with the male coupling shaft 17 of the photosensitive drum 7 is released to permit smooth demounting of the process cartridge B.

The member for mounting the releasing member 140 is not limited to the openable cover 14 if it is a member operated when the process cartridge B is mounted or demounted. When the drive transmission gear 34 is a helical gear, the releasing member 140 is not inevitable, and the coupling release is possible by the thrust produced by the helical gear.

Further Embodiment

In the first embodiment, the coupling of the photosensitive drum is constituted as a male shaft 17, and the coupling of the main assembly is constituted as a female shaft 18, but the female shaft and the male shaft may-be exchanged. In such a case, the same advantageous effects in the rotation accuracy of the photosensitive drum can be provided (FIGS. 23 and 24). In this example, if the tolerable transmission torque of the female shaft of the photosensitive drum is smaller than the tolerable transmission torque of the male shaft of the main assembly, the damage of the male shaft of the main assembly can be prevented.

For example, the female coupling shaft provided in the cartridge is made of polyacetal (POM), and the male coupling shaft constituted in the main assembly is made of zinc die-cast. By doing so, even if an abnormal torque is produced, the damage of the male shaft is prevented since the tolerable transmission torque of the, male coupling shaft of the main assembly side is large.

In the above-described embodiment, if a taper is formed at the end portion of the projection 17a or at the inlet portion of the recess 18a or at the both, combination between the projection 17a and the recess 18a is smoother.

In the foregoing, the process cartridge has been described as a cartridge for monochromatic image formation, but it is applicable to a cartridge for forming a multi-color image (two color, three color or full-color image, for example) if a plurality of developing means are used.

As for the developing method, any known methods such as a two-component magnetic brush developing method, a cascade developing method, a touch-down developing method, cloud developing method or the like may be used.

As for the electrophotographic photosensitive member, usable ones include amorphous silicon, amorphous selenium, zinc oxide, titanium oxide, organic photoconductor (OPC) and the like. As for methods for mountings photosensitive material, a photoconductor is evaporated or painted or applied on a cylinder of aluminum alloy or the like.

As for the charging means, a so-called contact type charging method is used in the foregoing examples. However, another method such as corona charging is usable, in which a tungsten wire is enclosed by metal shield of aluminum or the like at three side of the wire, and positive or negative ions are produced by applying a high voltage to the tungsten wire, and the surface of the photosensitive drum is uniformly charged by moving positive or negative ions to the surface.

As for the charging means, blade type (charging blade), pad type, block type, rod type, wire type or the like is usable in addition to the roller type.

As for the cleaning means for removing residual toner from the photosensitive drum, fur brush, magnetic brush or the like is usable, as well as the cleaning blade.

The process cartridge may contain a photosensitive member and at least one process means. The process cartridge may contain a photosensitive drum and charging means and is made detachably mountable to a main assembly of the apparatus. The process cartridge may contain a photosensitive drum and developing means and is made detachably mountable to a main assembly of the apparatus. The process cartridge may contain a photosensitive drum and cleaning means and is made detachably mountable to a main assembly of the apparatus. The process cartridge may contain a photosensitive drum and at least two process means.

The process cartridge may contain a photosensitive drum and charging means, developing means or cleaning means, and is made detachably mountable to a main assembly of the apparatus. The process cartridge may contain a photosensitive drum and at least one of charging means, developing means and cleaning means, and is made detachably mountable to a main assembly of the apparatus. The process cartridge may contain a photosensitive drum and at least developing means, and is made detachably mountable to a main assembly of the apparatus. Since the process cartridge is detachably mountable to the main assembly of the image forming apparatus by the user, this means that the maintenance of the apparatus using the process cartridge can be performed by the user by exchanging the process cartridge.

The present invention is applicable to a non-cartridge type image forming apparatus wherein the photosensitive drum, the developing means or the like is directly mounted to the main assembly of the apparatus.

In the foregoing, the description has been made as to a laser beam printer as an exemplary image forming apparatus, but the present invention is applicable to an electrophotographic copying machine, facsimile machine, word processor or another image forming machine.

As described in the foregoing, according to the present invention, the rotation accuracy of the driving transmission is improved, so the rotation accuracy of the electrophotographic photosensitive drum has been improved.

Additionally, the driving force can be assuredly transmitted from the main assembly to the electrophotographic photosensitive drum.

Furthermore, when the driving force is transmitted (during an image forming operation), the rotation center of the coupling of the main assembly of the apparatus and the coupling of the electrophotographic photosensitive drum can be substantially aligned.

Further additionally, when the driving force is transmitted (during the image forming operation), the electrophotographic photosensitive drum is attracted toward the main assembly side, so that the positional accuracy of the photosensitive member and therefore the process cartridge relative to the main assembly is improved.

Further additionally, when the driving transmission is not carried out (when the image is not formed), the drive transmission coupled state is released, so that the operativity in demounting of the process cartridge is improved. Further additionally, the diameter of the diameter of the coupling portion is small.

While the invention has been described with reference to the structures disclosed herein, it is not confined to the details set forth and this application is intended to cover such modifications or changes as may come within the purposes of the improvements or the scope of the following claims.

What is claimed is:

1. A driving rotatable member for an electrophotographic image forming apparatus for forming an image on a recording material, wherein said apparatus includes a motor for generating a rotational driving force for rotating an electrophotographic photosensitive drum, said driving rotatable member comprising:

(a) a driving force receiving portion for receiving the driving force from said motor; and (b) a twisted hole formed in a shaft integrally molded with said driving rotatable member and projected therefrom at a central portion thereof, said twisted hole having a non-circular cross-section with a plurality of corner portions, wherein said twisted hole is engageable with a twisted projection provided at a longitudinal end of said electrophotographic photosensitive drum and having a non-circular cross-section with a plurality of corner portions.

2. A driving rotatable member according to claim 1, wherein said driving force receiving portion includes a gear.

3. A driving rotatable member according to claim 1, wherein said electrophotographic photosensitive drum to which said driving rotatable member transmits the driving force is integral with process means actable on said electrophotographic photosensitive drum and is provided in a process cartridge.

4. A driving rotatable member according to claim 3, wherein said process means includes at least one of charging means, developing means and cleaning means, and wherein said process means and said electrophotographic photosensitive drum are contained in said process cartridge as a unit, which is detachably mountable to the main assembly of the image forming apparatus.

5. A driving rotatable member according to claim 1, 2 or 3, wherein a cross-section of said twisted hole is substantially equilaterally triangular, and wherein said twisted projection is in the form of a substantially equilateral triangular prism, and the corner portions of said twisted projection are beveled.

6. An electrophotographic image forming apparatus for forming an image on a recording material, comprising:

(a) an electrophotographic photosensitive drum;

(b) charging means for charging said electrophotographic photosensitive drum;

(c) developing means for developing a latent image formed on said electrophotographic photosensitive drum into a toner image;

(d) transfer means for transferring the toner image formed by said developing means from said electrophotographic photosensitive drum onto the recording material;

(e) fixing means for fixing the toner image transferred onto the recording material by said transfer means on the recording material;

(f) a motor;

(g) a driving rotatable member for transmitting a driving force from said motor;

said driving rotatable member including:

a driving force receiving portion for receiving the driving force from said motor;

a twisted hole formed in a shaft integrally molded with said driving rotatable member and projected therefrom at a central portion thereof and having a non-circular cross-section with a plurality of corner portions; and (h) a twisted projection provided at a longitudinal end of said electrophotographic photosensitive drum and having a non-circular cross-section with a plurality of corner portions, said twisted projection being engageable with said twisted hole, wherein the rotational driving force is transmitted to said electrophotographic photosensitive drum by engagement between said twisted hole and twisted projection with said twisted projection being urged toward said twisted hole, when said driving rotatable member is rotated with said twisted projection being in engagement with said twisted hole.

7. An apparatus according to claim 6, wherein said driving force receiving portion includes a gear.

8. An apparatus according to claim 6, wherein said electrophotographic photosensitive drum to which said driving rotatable member transmits the driving force is integral with process means actable on said electrophotographic photosensitive drum and is provided in a process cartridge.

9. An apparatus according to claim 8, wherein said process means includes at least one of charging means, developing means and cleaning means, and wherein said process means and said electrophotographic photosensitive drum are contained in said process cartridge as a unit, which is detachably mountable to the main assembly of the image forming apparatus.

10. An apparatus according to claim 6, 7 or 8, wherein a cross-section of said twisted hole is substantially equilaterally triangular, and wherein said twisted projection is in the form of a substantially equilateral triangular prism, and the corner portions of said twisted projection are beveled.

* * * * *

UNITED STATES PATENT AND TRADEMARK OFFICE
CERTIFICATE OF CORRECTION

PATENT NO. : 6,349,188 B1
DATED : February 19, 2002
INVENTOR(S) : Toshiharu Kawai et al.

It is certified that error appears in the above-identified patent and that said Letters Patent is hereby corrected as shown below:

Column 1,
Line 31, "one" ($2^{nd}$ occurrence) should be deleted.
Line 35, "an" ($2^{nd}$ occurrence) should read -- a --.
Line 56, "disclosed" should read -- disclosed in --.

Column 3,
Line 56, "comprising;" should read -- comprising: --.

Column 4,
Line 52, "view" should read -- view of --.
Line 65, "flange(driving" should read -- flange (driving --.

Column 5,
Line 32, "sectional are" should read -- are sectional --.
Line 49, "a-male" should read -- a male --.

Column 8,
Line 15, "17(circular" should read -- 17 (circular --.

Column 9,
Line 54, "polyamide" should read -- polyamide, --.

Column 11,
Line 50, "however" should read -- however, --.

Column 12,
Line 53, "u groove" should read -- U groove --.

Column 17,
Line 33, "12c 3" should read -- 12c3 --.

UNITED STATES PATENT AND TRADEMARK OFFICE
CERTIFICATE OF CORRECTION

PATENT NO. : 6,349,188 B1
DATED : February 19, 2002
INVENTOR(S) : Toshiharu Kawai et al.

It is certified that error appears in the above-identified patent and that said Letters Patent is hereby corrected as shown below:

Column 20,
Line 53, "may-be" should read -- may be --.

Column 22,
Line 25, "diameter of the" (2nd occurrence) should be deleted.

Signed and Sealed this

Fourteenth Day of January, 2003

JAMES E. ROGAN
*Director of the United States Patent and Trademark Office*